US012281759B2

(12) United States Patent
Jung et al.

(10) Patent No.: US 12,281,759 B2
(45) Date of Patent: Apr. 22, 2025

(54) HYDROGEN STORAGE SYSTEM

(71) Applicants: Hyundai Motor Company, Seoul (KR); Kia Corporation, Seoul (KR)

(72) Inventors: Se Kwon Jung, Seoul (KR); Kang Sik Jeon, Hwaseong-Si (KR); Kwi Seong Jeong, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 835 days.

(21) Appl. No.: 17/522,622

(22) Filed: Nov. 9, 2021

(65) Prior Publication Data

US 2022/0341546 A1 Oct. 27, 2022

(30) Foreign Application Priority Data

Apr. 23, 2021 (KR) ........................ 10-2021-0053333

(51) Int. Cl.
*F17C 7/02* (2006.01)
*F17C 13/02* (2006.01)
(Continued)

(52) U.S. Cl.
CPC .............. *F17C 7/02* (2013.01); *F17C 13/025* (2013.01); *F17C 13/026* (2013.01); *H01M 8/04208* (2013.01); *H01M 8/04328* (2013.01); *H01M 8/04425* (2013.01); *H01M 8/04776* (2013.01); *F17C 2201/0109* (2013.01);
(Continued)

(58) Field of Classification Search
CPC ......... H01M 8/04208; H01M 8/04328; H01M 8/04388; H01M 8/04753; H01M 8/04425
See application file for complete search history.

(56) References Cited

U.S. PATENT DOCUMENTS 2,984,978 A 5/1961 Arnold
2016/0254555 A1* 9/2016 Chikugo ........... H01M 8/04291
429/446

FOREIGN PATENT DOCUMENTS

GB 869274 A 5/1961
KR 20200136144 * 12/2020

OTHER PUBLICATIONS

KR20200136144 English translation. Choi. Dec. 7, 2020. (Year: 2020).*

(Continued)

*Primary Examiner* — Christopher P Domone
(74) *Attorney, Agent, or Firm* — Morgan, Lewis & Bockius LLP

(57) ABSTRACT

A hydrogen storage system may include a storage container storing liquid hydrogen, a supply line connected to the storage container and to a fuel cell system, the supply line supplying gaseous hydrogen to the fuel cell system from the storage container, a compressor mounted in the supply line and compressing the gaseous hydrogen, a bypass line connecting the supply line and the storage container and allowing the gaseous hydrogen to flow from the supply line to the storage container, a control valve mounted in the bypass line and selectively adjusting a bypass flow rate of the gaseous hydrogen, an orifice provided in the bypass line, and a controller configured to control the control valve, accurately adjusting a supply pressure of the storage container and a supply amount of the hydrogen to be supplied to the fuel cell system based on the operation conditions of the fuel cell system.

20 Claims, 8 Drawing Sheets

(51) Int. Cl.
    *H01M 8/04082*    (2016.01)
    *H01M 8/0432*     (2016.01)
    *H01M 8/0438*     (2016.01)
    *H01M 8/04746*    (2016.01)

(52) U.S. Cl.
    CPC .......... *F17C 2203/0621* (2013.01); *F17C 2205/0326* (2013.01); *F17C 2205/0352* (2013.01); *F17C 2221/012* (2013.01); *F17C 2223/013* (2013.01); *F17C 2227/0157* (2013.01); *F17C 2227/0302* (2013.01); *F17C 2250/032* (2013.01); *F17C 2250/043* (2013.01); *F17C 2250/0439* (2013.01); *F17C 2250/0443* (2013.01); *F17C 2250/0636* (2013.01); *F17C 2270/0184* (2013.01)

(56) References Cited

OTHER PUBLICATIONS

F. Michel, et. al., "Liquid Hydrogen Technologies for Mobile Use," WHEC 16/13—Jun. 16, 2006—Lyon France.

\* cited by examiner

HYDROGEN STORAGE SYSTEM

CROSS-REFERENCE TO RELATED APPLICATION

The present application claims priority to Korean Patent Application No. 10-2021-0053333 filed on Apr. 23, 2021, the entire contents of which is incorporated herein for all purposes by this reference.

BACKGROUND OF THE INVENTION

Field of the Invention

The present invention relates to a hydrogen storage system, and more particularly, to a cryogenic hydrogen storage system capable of accurately adjusting the supply amount and pressure of hydrogen to be supplied to a fuel cell system based on operating conditions of a mobility vehicle to which the fuel cell system is applied.

Description of Related Art

A fuel cell system refers to a system that continuously produces electrical energy by a chemical reaction of continuously supplied fuel. The fuel cell system has been consistently researched and developed as an alternative capable of solving global environmental issues.

Based on types of electrolytes used for the fuel cell system, the fuel cell system may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), a direct methanol fuel cell (DMFC), and the like. Based on operating temperatures, output ranges, and the like as well as types of used fuel, the fuel cell systems may be applied to various application fields related to mobile power, transportation, distributed power generation, and the like.

Among the fuel cells, the polymer electrolyte membrane fuel cell is applied to the field of a hydrogen vehicle (hydrogen fuel cell vehicle) being developed to substitute for an internal combustion engine. Furthermore, the applications of the polymer electrolyte membrane fuel cell are expanded to various mobility vehicles in the marine and aerospace fields.

The hydrogen mobility vehicle includes a fuel cell stack that produces electricity through an oxidation-reduction reaction between hydrogen and oxygen. The fuel cell system is consist of fuel cell stack, balance of plant (BOP) components which are supply hydrogen and air (including oxygen) to the stack and control stack temperature and controllers. The hydrogen vehicle is configured to travel as a motor is operated by electricity produced by the fuel cell stack.

Recently, to increase an energy storage density per unit volume of fuel (e.g., hydrogen) used for the fuel cell system, various attempts have been made to store liquid hydrogen in a storage container and supply the fuel cell system with the hydrogen (liquid hydrogen or gaseous hydrogen) stored in the storage container.

Meanwhile, to efficiently operate the fuel cellsystem, it is necessary to accurately adjust a vaporization amount of the liquid hydrogen stored in the storage container and the pressure in the storage container based on operation conditions of the fuel cell stack.

That is, the supply amount of hydrogen (gaseous hydrogen) to be supplied to the fuel cell system from the storage container is determined based on the vaporization amount of the liquid hydrogen and the pressure in the storage container (a change in pressure in the storage container that depends on the vaporization of the liquid hydrogen). Therefore, it is necessary to accurately adjust the vaporization amount of the liquid hydrogen and the pressure in the storage container based on the operation conditions of the fuel cell system.

Therefore, recently, various types of studies have been conducted to accurately adjust the vaporization amount of the liquid hydrogen and the pressure in the storage container based on the operation conditions of the fuel cell system, but the study result is still insufficient. Accordingly, there is a need to develop a technology to accurately adjust the vaporization amount of the liquid hydrogen and the pressure in the storage container.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a hydrogen storage system configured for accurately adjusting the supply amount of hydrogen to be supplied to a fuel cell system based on operation conditions of a fuel cell system.

The present invention, in various aspects, has also been made in an effort to accurately adjust a supply amount of liquid hydrogen stored in a storage container and a pressure in the storage container based on operation conditions of a fuel cell system.

The present invention, in various aspects, has also been made in an effort to improve efficiency in storing hydrogen and more rapidly supply the hydrogen (supply a fuel cell system with hydrogen at an increased hydrogen flow control speed).

The present invention, in various aspects, has also been made in an effort to minimize a discharge amount of hydrogen and delay the time required to discharge the hydrogen to the outside of a hydrogen storage system including a hydrogen storage container, a connection tube, and a valve under a condition in which the hydrogen stored in the storage container is not supplied to a fuel cell system.

The present invention, in various aspects, has also been made in an effort to increase a supply flow rate and pressure range of hydrogen and improve energy efficiency.

The present invention, in various aspects, has also been made in an effort to improve stability and reliability.

The objects to be achieved by the exemplary embodiments are not limited to the above-mentioned objects, but also include objects or effects which may be understood from the solutions or embodiments described below.

Various aspects of the present invention provide a hydrogen storage system including: a storage container configured to store liquid hydrogen; a supply line having a first end portion connected to the storage container and a second end portion connected to a fuel cell system, the supply line being configured to supply gaseous hydrogen to the fuel cell system from the storage container; a compressor mounted in the supply line and configured to compress the gaseous hydrogen; a bypass line connecting the supply line and the storage container and configured to allow the gaseous hydrogen to flow from the supply line to the storage container; a control valve mounted in the bypass line and configured to selectively adjust a bypass flow rate of the gaseous hydrogen; an orifice provided in the bypass line and positioned at a downstream side of the control valve; and a controller electrically connected to the control valve and the compressor and configured to control the control valve and the compressor.

This is to accurately adjust a supply amount of hydrogen to be supplied to the fuel cell system based on the operation conditions of the fuel cell system.

That is, when the hydrogen in a liquid state is stored in the storage container, the energy storage density per unit volume may be increased, but it is difficult to rapidly and accurately adjust the pressure in the storage container and the vaporization amount of the liquid hydrogen stored in the storage container. The supply amount of hydrogen (gaseous hydrogen) to be supplied to the fuel cell system from the storage container is determined based on the vaporization amount of the liquid hydrogen and the pressure in the storage container (a change in pressure in the storage container that depends on the vaporization and expansion of the liquid hydrogen). Therefore, it is necessary to accurately adjust the vaporization amount of the liquid hydrogen and the pressure in the storage container based on the operation conditions of the fuel cell system.

Generally, it is difficult to rapidly and accurately adjust the pressure in the storage container and the vaporization amount of the liquid hydrogen stored in the storage container based on the operation conditions of the fuel cell system. Accordingly, it is difficult to accurately adjust the supply amount of hydrogen to be supplied to the fuel cell system. Furthermore, the hydrogen is supplied at a pressure lower than the supply pressure of hydrogen required by the fuel cell system, which causes the hydrogen starvation, or the pressure in the storage container is excessively increased, which degrades safety and reliability.

In contrast, according to the exemplary embodiment of the present invention, the control valve may be controlled based on the internal pressure of the storage container (or the bypass flow rate of the gaseous hydrogen), and thus the vaporization amount of the liquid hydrogen (the internal pressure of the storage container) may be adjusted. Therefore, it is possible to accurately adjust the vaporization amount of the liquid hydrogen based on the operation conditions of the fuel cell system. Therefore, since the gaseous hydrogen may be inhibited from being excessively supplied along the bypass line (the heat quantity applied to the liquid hydrogen may be inhibited from being excessively increased), it is possible to inhibit an excessive increase in pressure in the storage container (the excessive expansion of the storage container) caused by an excessive vaporization amount of the liquid hydrogen. Furthermore, because the gaseous hydrogen may be inhibited from being supplied in an excessively small amount along the bypass line (the heat quantity applied to the liquid hydrogen may be inhibited from being excessively decreased), it is possible to inhibit a lack of hydrogen supply amount caused by the excessively small vaporization amount of the liquid hydrogen. Therefore, it is possible to obtain an advantageous effect of improving safety and reliability of the entire mobility vehicle.

Among other things, according to the exemplary embodiment of the present invention, the bypass line may have the orifice, generating a choked flow (or a critical flow) in the flow of the gaseous hydrogen flowing along the bypass line. Therefore, it is possible to obtain an advantageous effect of more precisely controlling the bypass flow rate of the gaseous hydrogen flowing along the bypass line.

The bypass line may have various structures configured for allowing the gaseous hydrogen to flow to the storage container from the supply line.

For example, the bypass line may be provided to pass through the inside of the storage container, one end portion of the bypass line may be connected to the supply line between the compressor and the fuel cell system, and the other end portion of the bypass line may be connected to the supply line between the compressor and the storage container. As various exemplary embodiments of the present invention, one end portion of the bypass line may be connected to the supply line between the compressor and the fuel cell system, and the other end portion of the bypass line may be exposed to the inside of the storage container.

According to the exemplary embodiment of the present invention, the controller may be configured to control the control valve according to an internal pressure of the storage container.

For example, the controller may adjust the bypass flow rate of the gaseous hydrogen passing through the control valve to a flow rate higher than a predetermined reference flow rate when the internal pressure of the storage container is lower than a predetermined reference pressure, and the controller may adjust the bypass flow rate of the gaseous hydrogen passing through the control valve to a flow rate lower than the predetermined reference flow rate when the internal pressure of the storage container is higher than the reference pressure.

A compression ratio of the compressor may be 1.9 or more. Since the compression ratio of the compressor is 1.9 or more as described above, the pressure ratio between the pressure at the upstream side of the orifice and the pressure at the downstream side of the orifice may be 1.9 or more such that the choked flow may be generated around the orifice.

According to the exemplary embodiment of the present invention, the hydrogen storage system may include a flow rate measurement part configured to measure the bypass flow rate of the gaseous hydrogen flowing to the bypass line from the supply line, and the controller may be configured to control the control valve according to a measurement result obtained by the flow rate measurement part.

The flow rate measurement part may measure, in various ways, the bypass flow rate of the gaseous hydrogen flowing to the bypass line from the supply line.

According to the exemplary embodiment of the present invention, the flow rate measurement part may include: a first pressure sensor provided in the supply line, disposed between the compressor and the storage container, and configured to measure a pressure of the gaseous hydrogen at an upstream side of the compressor; and a second pressure sensor provided in the supply line, disposed between the compressor and the fuel cell system, and configured to measure a pressure of the gaseous hydrogen at a downstream side of the compressor, and the flow rate measurement part may measure the bypass flow rate of the gaseous hydrogen according to a pressure ratio between a first pressure of the gaseous hydrogen measured by the first pressure sensor and a second pressure of the gaseous hydrogen measured by the second pressure sensor.

According to the exemplary embodiment of the present invention, the hydrogen storage system may include a temperature sensor provided in the supply line, disposed between the compressor and the fuel cell system, and configured to measure a temperature of the gaseous hydrogen at the downstream side of the compressor.

A heat quantity Q applied to the liquid hydrogen by the gaseous hydrogen flowing to the bypass line may be defined by the following Equation 1.

$$Q = C_1 \times (P2 - P1) \times (T - C_T) \quad \text{[Equation 1]}$$

(herein, $C_1$ represents a coefficient defined by [specific heat of the gaseous hydrogen]×[a pressure/flow rate conversion coefficient]×[a heat transfer rate of the bypass line], P2 represents the second pressure of the gaseous hydrogen measured by the second pressure sensor, P1 represents the first pressure of the gaseous hydrogen measured by the first pressure sensor, T represents a temperature of the gaseous hydrogen measured by the temperature sensor, $C_T$ represents an internal temperature of the storage container and may be used as a temperature constant or a value measured by the temperature sensor.)

According to the exemplary embodiment of the present invention, when a pressure ratio (a pressure ratio between the first pressure and the second pressure) is lower than a predetermined reference pressure ratio, the controller may adjust the bypass flow rate of the gaseous hydrogen passing through the control valve to a flow rate higher than a predetermined reference flow rate.

It is possible to increase the heat quantity supplied from the outside of the storage container and to be applied to the liquid hydrogen by adjusting the bypass flow rate of the gaseous hydrogen passing through the control valve to the flow rate higher than the predetermined reference flow rate (e.g., by increasing an opening amount of the control valve) as described above. Therefore, it is possible to increase the vaporization amount of the liquid hydrogen (the supply amount of the gaseous hydrogen to be supplied to the fuel cell system). Furthermore, since the pressure of the gaseous hydrogen in the storage container is increased by the vaporization of the liquid hydrogen, it is possible to increase the pressure in the storage container.

According to the exemplary embodiment of the present invention, when the pressure ratio (the pressure ratio between the first pressure and the second pressure) is higher than the reference pressure ratio, the controller may adjust the bypass flow rate of the gaseous hydrogen passing through the control valve to a flow rate lower than the predetermined reference flow rate.

As described above, it is possible to decrease the heat quantity to be applied to the liquid hydrogen by adjusting the bypass flow rate of the gaseous hydrogen passing through the control valve to the flow rate lower than the predetermined reference flow rate (e.g., by decreasing the opening amount of the control valve or closing the control valve). Therefore, it is possible to decrease the vaporization amount of the liquid hydrogen (the supply amount of the gaseous hydrogen to be supplied to the fuel cell system).

According to the exemplary embodiment of the present invention, the controller may adjust the bypass flow rate of the gaseous hydrogen passing through the control valve to a flow rate higher than a predetermined reference flow rate when the heat quantity Q applied to the liquid hydrogen by the gaseous hydrogen is smaller than a predetermined reference heat quantity, and the controller may adjust the bypass flow rate of the gaseous hydrogen passing through the control valve to a flow rate lower than the predetermined reference flow rate when the heat quantity Q applied to the liquid hydrogen by the gaseous hydrogen is equal to or greater than the predetermined reference heat quantity.

According to the exemplary embodiment of the present invention, the hydrogen storage system may include: a discharge line connected to the storage container and configured to discharge the gaseous hydrogen to the outside; and a discharge valve provided in the discharge line and configured to selectively open or close the discharge line.

According to the exemplary embodiment of the present invention, when an input of an operation stop signal for the fuel cell system is detected while the fuel cell system operates, the operation of the fuel cell system may be stopped when a condition is satisfied in which the compressor operates until the first pressure of the gaseous hydrogen becomes equal to or lower than a preset first target pressure in a state in which the control valve closes the bypass line.

This is based on the fact that the density of the liquid hydrogen increases as the pressure of the liquid hydrogen decreases, and when the pressure of the liquid hydrogen decreases, the volume of the liquid hydrogen decreases such that an extra space for trapping the vaporized gaseous hydrogen is provided in the storage container. It is possible to decrease a speed of an increase in an internal pressure of the storage container caused by the vaporization of the liquid hydrogen by generating an effect of increasing the volume of the storage container in a state in which the operation of the fuel cell system is ended (e.g., a state in which the operation is stopped for a long time period) by increasing the density of the liquid hydrogen by decreasing the internal pressure of the storage container during the process of ending the operation of the fuel cell system. Furthermore, by increasing the difference between the pressure in the storage container and the operating pressure of the discharge valve, it is possible to delay the time it takes for the pressure in the storage container reach the operating pressure of the discharge valve at which the discharge valve begins to operate. Therefore, it is possible to obtain an advantageous effect of minimizing the discharge amount of the gaseous hydrogen caused by the increase in an internal pressure of the storage container.

According to the exemplary embodiment of the present invention, the first target pressure may be defined as a pressure lower than a preset operating pressure at which the discharge valve begins to operate to open the discharge line. The first target pressure may be 90% or less of the operating pressure of the discharge valve.

For example, the first target pressure may be defined as a low pressure equal to or similar to the atmospheric pressure. The first target pressure may be defined as a pressure lower than the internal pressure of the storage container while the fuel cell system normally operates.

According to the exemplary embodiment of the present invention, the operation of the compressor may be stopped when the second pressure of the gaseous hydrogen is equal to or greater than the first target pressure.

The first target pressure may be defined as a pressure lower than the preset operating pressure at which the discharge valve begins to operate.

According to the exemplary embodiment of the present invention, the remaining amount HGR of the gaseous hydrogen remaining in the storage container at the point in time at which the operation of the fuel cell system is stopped may satisfy the following Equation 2.

$$HGR = f(HCL, CP) \times P1 \times \text{Density Coefficient of Liquid Hydrogen} \quad \text{[Equation 2]}$$

(herein, f represents a function of an occupation volume of the gaseous hydrogen in the storage container determined by a capacity CP of the storage container and a liquid level HCL of the liquid hydrogen, and P1 represents the first pressure of the gaseous hydrogen measured by the first pressure sensor.)

For example, in a case in which the storage container has a cylindrical shape having a circular cross-section and the storage container is disposed in a vertical direction, f may satisfy the following Equation 3. In a case in which the storage container is disposed in a horizontal direction, f may satisfy the following Equation 4.

$$f = CP/h \times (h - HCL) \quad \text{[Equation 3]}$$

(herein, HCL represents a liquid level (%) of the liquid hydrogen, CP represents a capacity of the storage container, and h represents a height of the storage container in the vertical direction.)

$$f = CP - l\left(r^2 \cos^{-1}\left(\frac{r - HCL}{r}\right) - (r - HCL)\sqrt{2rHCL - HCL^2}\right) \quad \text{[Equation 4]}$$

(herein, HCL represents a liquid level (%) of the liquid hydrogen, CP represents a capacity of the storage container, r represents a diameter of the storage container, and L represents a length of the storage container in the horizontal direction thereof.)

According to the exemplary embodiment of the present invention, when an input of an operation start signal for the fuel cell system is detected while the operation of the fuel cell system is stopped and it is determined that the first pressure of the gaseous hydrogen is lower than a preset second target pressure, the fuel cell system may operate when a condition is satisfied in which the compressor operates until the first pressure of the gaseous hydrogen becomes equal to or greater than the second target pressure in a state in which the control valve opens the bypass line.

This is based on the fact that after the operation of the fuel cell system is ended, the internal pressure of the storage container varies, at the point in time at which the fuel cell system begins to operate again, depending on the elapsed time from the end portion of the operation, the outside temperature, and the thermal insulation performance of the storage container. The compressor may operate based on the internal pressure of the storage container during the process in which the fuel cell system begins to operate again. Therefore, it is possible to obtain an advantageous effect of more rapidly generating a sufficient pressure in the storage container at the point in time at which the fuel cell system begins to operate again.

According to the exemplary embodiment of the present invention, the hydrogen storage system may include a heating part provided in the supply line and disposed between the storage container and the compressor.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
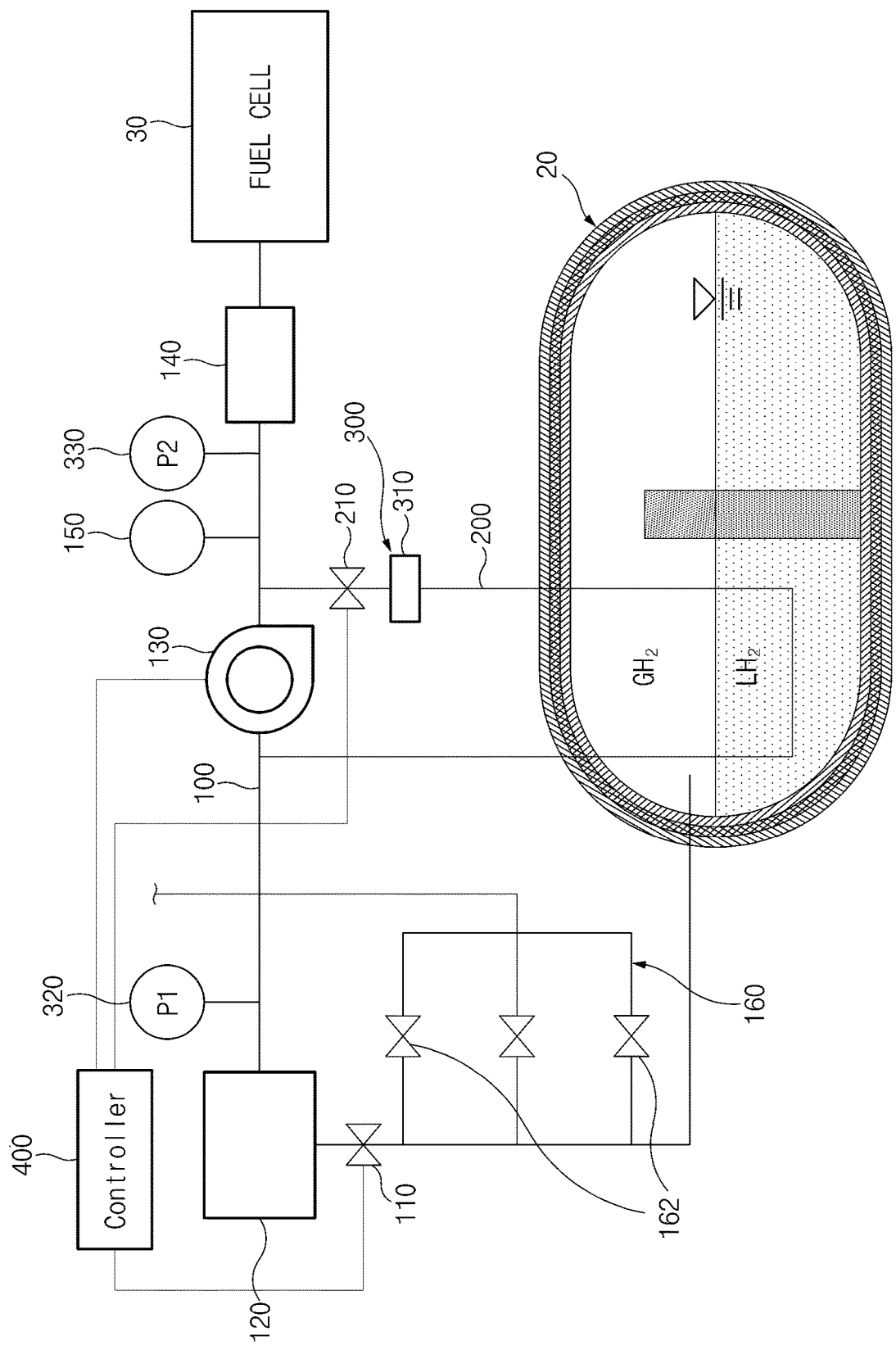
FIG. 1 is a view for explaining a hydrogen storage system according to various exemplary embodiments of the present invention.
Figure 2:
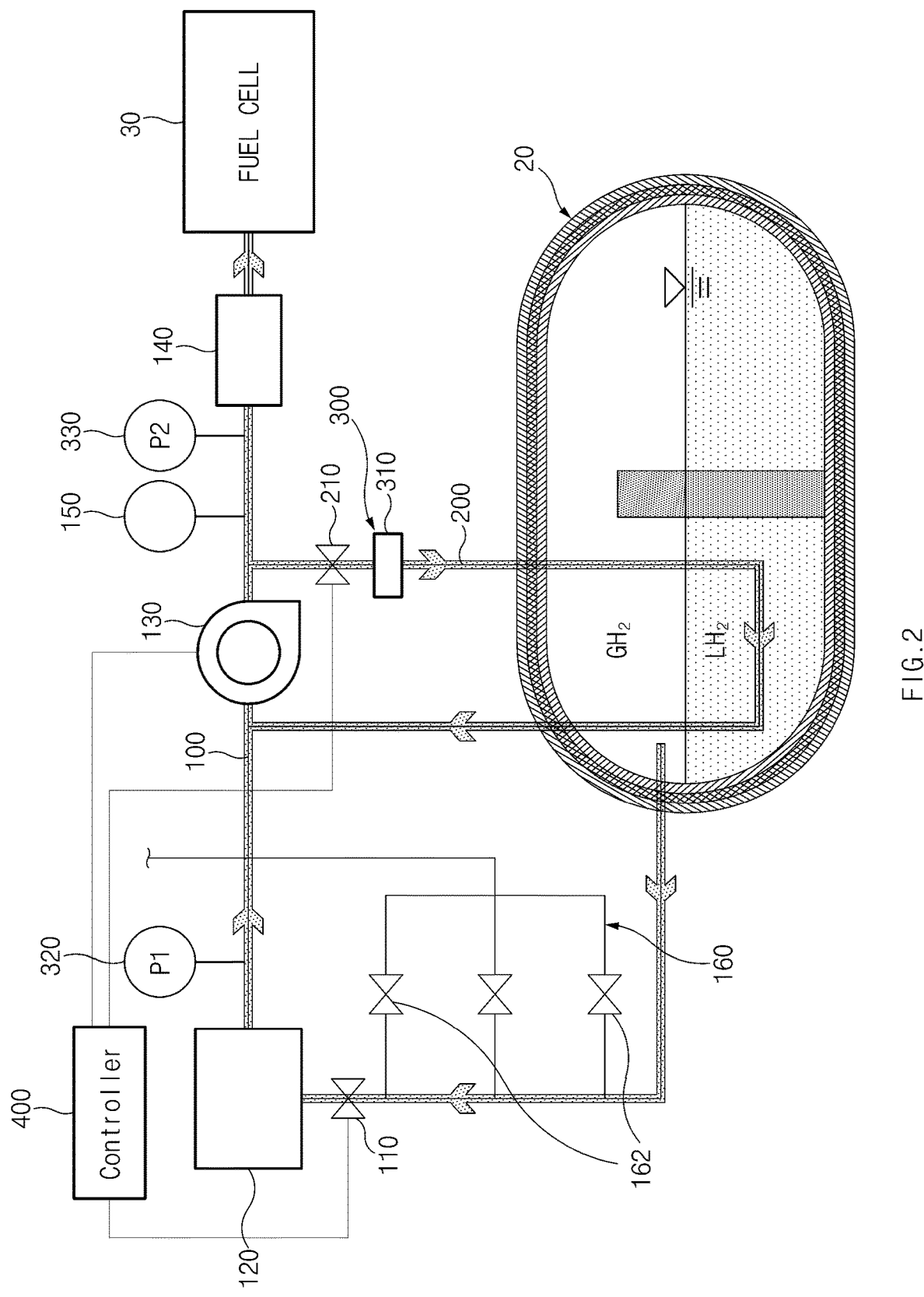
FIG. 2 is a view for explaining a flow of gaseous hydrogen in the hydrogen storage system according to the exemplary embodiment of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying drawings.

However, the technical spirit of the present invention is not limited to various exemplary embodiments described herein but may be implemented in various different forms. One or more of the constituent elements in the exemplary embodiments may be selectively combined and substituted for use within the scope of the technical spirit of the present invention.

Furthermore, unless otherwise specifically and explicitly defined and stated, the terms (including technical and scientific terms) used in the exemplary embodiments of the present invention may be construed as the meaning which may be commonly understood by the person with ordinary skill in the art to which various exemplary embodiments of the present invention pertains. The meanings of the commonly used terms such as the terms defined in dictionaries may be interpreted in consideration of the contextual meanings of the related technology.

Furthermore, the terms used in the exemplary embodiments of the present invention are for explaining the embodiments, not for limiting the present invention.

In the exemplary embodiment, unless particularly stated otherwise, a singular form may also include a plural form. The expression "at least one (or one or more) of A, B, and C" may include one or more of all combinations that can be made by combining A, B, and C.

Furthermore, the terms such as first, second, A, B, (a), and (b) may be used to describe constituent elements of the exemplary embodiments of the present invention.

These terms are used only for discriminating one constituent element from another constituent element, and the nature, the sequences, or the orders of the constituent elements are not limited by the terms.

Furthermore, when one constituent element is described as being 'connected', 'coupled', or 'attached' to another constituent element, one constituent element may be connected, coupled, or attached directly to another constituent element or connected, coupled, or attached to another constituent element through yet another constituent element interposed therebetween.

Furthermore, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIG. 1, FIG. 2, FIG. 3, FIG. 4, and FIG. 5, a hydrogen storage system 10 according to the exemplary embodiment of the present invention includes: a storage container 20 configured to store liquid hydrogen $LH_2$; a supply line 100 having one end portion connected to the storage container 20 and the other end portion connected to a fuel cell system 30, the supply line 100 being configured to supply gaseous hydrogen $GH_2$ from the storage container 20 to the fuel cell system 30; a compressor 130 provided in a supply line 100 and configured to compress the gaseous hydrogen $GH_2$; a bypass line 200 to connect the supply line 100 and the storage container 20 and allow the gaseous hydrogen $GH_2$ to flow to the storage container 20 from the supply line 100; a flow rate measurement part 300 configured to measure a bypass flow rate of the gaseous hydrogen $GH_2$ flowing from the supply line 100 to the bypass line 200; a control valve 210 provided in the bypass line 200 and configured to selectively adjust the bypass flow rate of the gaseous hydrogen $GH_2$; an orifice 310 provided in the bypass line 200 and positioned at a downstream side of the control valve 210; and a controller 400 configured to control the control valve 210 based on the measurement result obtained by the flow rate measurement part 300.

For reference, the hydrogen storage system 10 according to the exemplary embodiment of the present invention may be applied to various fuel cell vehicles (e.g., passenger vehicles or commercial vehicles), ships, mobility vehicles in aerospace fields, or the like to which the fuel cell system 30 may be applied. The present invention is not restricted or limited by the types and properties of the target objects to which the hydrogen storage system 10 is applied.

The storage container 20 is provided to store liquid hydrogen used for the fuel cell system 30.

The storage container 20 may have various structures configured for storing the liquid hydrogen (e.g., at −253° C.), and the present invention is not restricted or limited by the type and structure of the storage container 20.

For example, the storage container 20 may include an internal tank having an accommodation space therein, an external tank configured to surround the internal tank, and a thermal insulation layer provided between the internal tank and the external tank.

The internal tank, the external tank, and the thermal insulation layer, which form the storage container 20, may be variously changed in materials and properties in accordance with required conditions and design specifications.

Furthermore, a level sensor may be provided in the storage container 20 and measure a level of the liquid hydrogen $LH_2$.

A contact level sensor (e.g., a float switch) or a contactless level sensor (e.g., an ultrasonic level sensor or a capacitance level sensor), which is configured for measuring a level of the liquid hydrogen $LH_2$, may be used as the level sensor. The present invention is not restricted or limited by the type of level sensor and the method of measuring the level.

For reference, a lower space of the storage container 20 may accommodate the liquid hydrogen $LH_2$, and an upper space of the storage container 20 may accommodate the gaseous hydrogen $GH_2$ vaporized from the liquid hydrogen $LH_2$ (or supplied along the bypass line).

The supply line 100 is provided to supply the fuel cell system 30 with the gaseous hydrogen $GH_2$ vaporized in the storage container 20.

One end portion of the supply line 100 may be connected to the storage container 20, and the other end portion of the supply line 100 may be connected to the fuel cell system 30. The gaseous hydrogen $GH_2$ vaporized in the storage container 20 may be supplied to the fuel cell system 30 along the supply line 100.

For reference, the fuel cell system 30 refers to a kind of power generation device that generates electrical energy through a chemical reaction of fuel (e.g., hydrogen), and the fuel cell system may be configured by stacking several tens or hundreds of fuel cells (unit cells) in series.

The fuel cell system 30 may have various structures configured for producing electricity by an oxidation-reduction reaction between fuel (e.g., hydrogen) and an oxidant (e.g., air).

For example, the fuel cell system 30 includes: a membrane electrode assembly (MEA) having catalyst electrode layers, in which electrochemical reactions occur, at two opposite sides of an electrolyte membrane through which hydrogen ions move; a gas diffusion layer (GDL) configured to uniformly distribute reactant gases and are configured to transfer generated electrical energy; a gasket and a fastener configured to maintain leakproof sealability for the reactant gases and the coolant and maintain an appropriate fastening pressure; and a separator (bipolar plate) configured to move the reactant gases and the coolant.

In the fuel cell system 30, hydrogen, which is fuel, and air (oxygen), which is an oxidant, are supplied to an anode and a cathode of the membrane electrode assembly, respectively, through flow paths in the separators such that the hydrogen is supplied to the anode, and the air is supplied to the cathode.

The hydrogen supplied to the anode is decomposed into hydrogen ions (protons) and electrons by catalysts in the electrode layers provided at both sides of the electrolyte membrane. Only the hydrogen ions are selectively transmitted to the cathode through the electrolyte membrane, which is a cation exchange membrane, and at the same time, the electrons are transmitted to the cathode through the gas diffusion layer and the separator which are conductors.

At the cathode, the hydrogen ions supplied through the electrolyte membrane and the electrons delivered through the separator meet oxygen in the air supplied to the cathode by an air supply device, generating a reaction of producing water. As a result of the movement of the hydrogen ions, the electrons flow through external conductive wires, and the electric current is produced as a result of the flow of the electrons.

The compressor 130 is provided in the supply line 100 to compress the gaseous hydrogen $GH_2$ supplied along the supply line 100.

A typical compressor 130 configured for compressing the gaseous hydrogen $GH_2$ supplied along the supply line 100 may be used as the compressor 130. The present invention is not restricted or limited by the type and structure of the compressor 130.

According to the exemplary embodiment of the present invention, the hydrogen storage system 10 may include a heating part 120 provided in the supply line 100 and disposed between the storage container 20 and the compressor 130.

The heating part 120 may heat the gaseous hydrogen $GH_2$ (or vaporize the liquid hydrogen) at a low temperature (e.g., −240° C. to −230° C.) discharged from the storage container 20 to a temperature (e.g., a room temperature) suitable for the operation of the fuel cell system 30.

The heating part 120 may have various structures configured for increasing the temperature of the gaseous hydrogen $GH_2$ flowing along the supply line 100. The present invention is not restricted or limited by the type and structure of the heating part 120.

For example, the heating part 120 may allow a coolant, which circulates through a cooling line passing through the fuel cell system 30 or electrical components (power electronic parts) in the vehicle, to exchange heat with the gaseous hydrogen $GH_2$ flowing along the supply line 100, increasing the temperature of the gaseous hydrogen $GH_2$ to be supplied to the fuel cell system 30.

According to various exemplary embodiments of the present invention, the heating part 120 may be configured to allow oil circulating through an oil circulation line in the vehicle to exchange heat with the gaseous hydrogen $GH_2$ flowing along the supply line 100.

Alternatively, a heater may be provided instead of (or in addition to) the heating part 120, and the heater may increase the temperature of the gaseous hydrogen $GH_2$ discharged from the storage container 20.

Furthermore, according to the exemplary embodiment of the present invention, the hydrogen storage system 10 may include a shut-off valve 110 provided in the supply line 100 and disposed between the storage container 20 and the heating part 120.

A typical valve configured for selectively turning on or off the flow of the gaseous hydrogen $GH_2$ to be supplied to the heating part 120 from the storage container 20 may be used as the shut-off valve 110. The present invention is not restricted or limited by the type and structure of the shut-off valve 110.

According to various exemplary embodiments of the present invention, the shut-off valve may be configured to adjust the flow rate of the gaseous hydrogen to be supplied to the heating part from the storage container.

According to the exemplary embodiment of the present invention, the hydrogen storage system 10 may include a buffer part 140 provided in the supply line 100 and disposed between the compressor 130 and the fuel cell system 30 (e.g., between the second pressure sensor and the fuel cell system).

The buffer part 140 includes a buffer chamber having a predetermined volume and configured to temporarily store the gaseous hydrogen $GH_2$ having passed through the compressor 130 before the gaseous hydrogen $GH_2$ is supplied to the fuel cell system 30. The buffer chamber may be variously changed in volume and structure in accordance with required conditions and design specifications.

As described above, the buffer part 140 is provided between the compressor 130 and the fuel cell system 30, and the buffer chamber of the buffer part 140 is filled with the gaseous hydrogen $GH_2$. Therefore, it is possible to obtain an advantageous effect of improving the stability in supplying the gaseous hydrogen $GH_2$ to the fuel cell system 30 and more accurately controlling the supply pressure of the gaseous hydrogen $GH_2$ to be supplied to the fuel cell system 30.

The bypass line 200 connects the supply line 100 and the storage container 20 and allows the gaseous hydrogen $GH_2$ to flow from the supply line 100 to the storage container 20.

In the instant case, the configuration in which the gaseous hydrogen $GH_2$ flows from the supply line 100 to the storage container 20 through the bypass line 200 may mean that gaseous hydrogen $GH_2$ supplied to the storage container 20 through the bypass line 200 flows while passing through the inside of the storage container 20 or is directly supplied (sprayed) into the storage container 20.

The bypass line 200 may have various structures configured for allowing the gaseous hydrogen $GH_2$ to flow from the supply line 100 to the storage container 20. The present invention is not restricted or limited by the structure and shape of the bypass line 200.

For example, the bypass line 200 may have an approximately "U" shape and pass through the inside of the storage container 20. One end portion of the bypass line 200 may be connected to supply line 100 between the compressor 130 and the fuel cell system 30 (e.g., between the compressor and the buffer part). The other end portion of the bypass line 200 may be connected to the supply line 100 between the compressor 130 and the storage container 20 (e.g., between the heating part and the compressor). A lower end portion (based on FIG. 1) of the bypass line 200 may be disposed to pass through the inside of the storage container 20.

According to various exemplary embodiments of the present invention, the bypass line may be connected to an upstream side of the heating part (e.g., between the storage container and the heating part).

In the exemplary embodiment of the present invention, the configuration in which the bypass line 200 passes through the inside of the storage container 20 may mean that the bypass line 200 passes through at least any one of the liquid hydrogen $LH_2$ accommodated in the lower space of the storage container 20 and the gaseous hydrogen $GH_2$ accommodated in the upper space of the storage container 20. Hereinafter, the example will be described in which the bypass line 200 passes only through the gaseous hydrogen GHz accommodated in the upper space of the storage container 20.

As described above, the high-temperature gaseous hydrogen GHz (e.g., the room-temperature gaseous hydrogen having passed through the heating part) flowing along the supply line 100 flows to the storage container 20 through the bypass line 200. Therefore, the gaseous hydrogen GHz, which is allowed to flow to the storage container 20, is configured as a heat medium for heating (increasing the temperature of) the liquid hydrogen $LH_2$ to vaporize the liquid hydrogen $LH_2$.

According to the exemplary embodiment of the present invention, the hydrogen storage system 10 may include the flow rate measurement part 300 configured to measure the bypass flow rate of the gaseous hydrogen GHz flowing from the supply line 100 to the bypass line 200.

This is to accurately determine the vaporization amount of the liquid hydrogen $LH_2$ vaporized by the gaseous hydrogen GHz flowing from the supply line 100 to the bypass line 200.

This is based on the fact that when the bypass flow rate of the gaseous hydrogen GHz flowing from the supply line 100 to the bypass line 200 is measured, a heat quantity applied to the liquid hydrogen $LH_2$ by the gaseous hydrogen GHz may be recognized, and the vaporization amount of the liquid hydrogen $LH_2$ may be determined based on the heat quantity applied to the liquid hydrogen $LH_2$.

The flow rate measurement part 300 may use various methods to measure the bypass flow rate of the gaseous hydrogen $GH_2$ flowing from the supply line 100 to the bypass line 200. The present invention is not restricted or limited by the structure of the flow rate measurement part 300 and the method of measuring the bypass flow rate.

For example, the flow rate measurement part 300 may include: a first pressure sensor 320 provided in the supply line 100, disposed between the compressor 130 and the storage container 20, and configured to measure the pressure of the gaseous hydrogen $GH_2$ at the upstream side of the compressor 130; and a second pressure sensor 330 provided in the supply line 100, disposed between the compressor 130 and the fuel cell system 30, and configured to measure the pressure of the gaseous hydrogen $GH_2$ at the downstream side of the compressor 130. The flow rate measurement part 300 may measure the bypass flow rate of the gaseous hydrogen $GH_2$ based on a pressure ratio between a first pressure P1 of the gaseous hydrogen $GH_2$ measured by the first pressure sensor 320 and a second pressure P2 of the gaseous hydrogen $GH_2$ measured by the second pressure sensor 330.

The orifice 310 is provided to generate a choked flow (or a critical flow) or choking in the flow of the gaseous hydrogen $GH_2$ flowing from the supply line 100 to the bypass line 200.

That is, the orifice 310 having a predetermined cross-sectional area generates the choked flow in the bypass line 220. Therefore, the flow rate of the gaseous hydrogen $GH_2$ may be limited at the downstream side of the orifice 310 even though the pressure at the downstream side of the orifice 310 decreases. Therefore, a linear relationship may be made between the flow rate and the pressure ratio (the pressure at the upstream side of the orifice/the pressure at the downstream side of the orifice) between the pressure at the upstream side of the orifice 310 and the pressure at the downstream side of the orifice 310. For example, the flow rate (bypass flow rate) of the gaseous hydrogen $GH_2$ passing through the orifice 310 may be linearly increased in response to the increase in pressure ratio.

As described above, the linear relationship may be made between the flow rate and the pressure ratio between the pressure at the upstream side of the orifice 310 and the pressure at the downstream side of the orifice 310. Therefore, the flow rate of the gaseous hydrogen $GH_2$ (the bypass flow rate of the gaseous hydrogen) passing through the orifice 310 may be determined by obtaining the first pressure P1 of the gaseous hydrogen $GH_2$ measured by the first pressure sensor 320 (the pressure at the downstream side of the orifice) and the second pressure P2 of the gaseous hydrogen $GH_2$ measured by the second pressure sensor 330 (the pressure at the upstream side of the orifice).

In the instant case, the first pressure P1 is an inlet pressure of the compressor 130 and corresponds to the internal pressure of the storage container 20 and the pressure at the downstream side of the orifice 310. Furthermore, the second pressure P2 is an outlet pressure of the compressor 130 and corresponds to the pressure at the upstream side of the orifice 310.

In the exemplary embodiment of the present invention illustrated and described above, the example has been described in which the first pressure sensor is provided in the supply line and disposed between the storage container and the compressor. However, according to various exemplary embodiments of the present invention, the first pressure sensor may be provided directly in the storage container (e.g., disposed in the storage container).

The orifice 310 may be variously changed in type and size (cross-sectional area) in accordance with required conditions and design specifications, and the present invention is not restricted or limited by the type and size of the orifice 310.

A compression ratio of the compressor 130 may be 1.9 or more.

Since the compression ratio of the compressor 130 is 1.9 or more as described above, the pressure ratio between the pressure at the upstream side of the orifice 310 and the pressure at the downstream side of the orifice 310 may be 1.9 or more such that the choked flow may be generated around the orifice 310.

In contrast, if the pressure ratio between the pressure at the upstream side of the orifice 310 and the pressure at the downstream side of the orifice 310 is lower than 1.9 (the compression ratio of the compressor is lower than 1.9), the choked flow is difficult to generate around the orifice 310.

According to the exemplary embodiment of the present invention, the hydrogen storage system 10 may include a temperature sensor 150 provided in the supply line 100, disposed between the compressor 130 and the fuel cell system 30 (e.g., between the compressor and the second pressure sensor), and configured to measure the temperature of the gaseous hydrogen $GH_2$ at the downstream side of the compressor 130.

A heat quantity Q applied to the liquid hydrogen $LH_2$ by the gaseous hydrogen $GH_2$ flowing to the bypass line 200 may be defined by the following Equation 1.

$$Q = C_1 \times (P2-P1) \times (T-C_T) \qquad [\text{Equation 1}]$$

(herein, $C_1$ represents a coefficient defined by [specific heat of the gaseous hydrogen $GH_2$]×[a pressure/flow rate conversion coefficient]×[a heat transfer rate of the bypass line 200], P2 represents the second pressure P2 of the gaseous hydrogen $GH_2$ measured by the second pressure sensor 330, P1 represents the first pressure P1 of the gaseous hydrogen $GH_2$ measured by the first pressure sensor 320, T represents the temperature of the gaseous hydrogen $GH_2$ measured by the temperature sensor 150, and $C_T$ represents an internal temperature constant (e.g., −273° C. to −240° C.) of the storage container 20.)

For reference, the internal temperature constant $C_T$ of the storage container 20 is a constant which may vary depending on materials and thicknesses of the storage container 20 and tubes. The internal temperature constant $C_T$ may be obtained by experiments.

The control valve 210 is provided in the bypass line 200 and selectively adjusts the bypass flow rate of the gaseous hydrogen $GH_2$.

Various valve means configured for selectively adjusting the bypass flow rate of the gaseous hydrogen $GH_2$ may be used as the control valve 210. The present invention is not restricted or limited by the type and structure of the control valve 210.

For example, a typical solenoid valve or a typical butterfly valve may be used as the control valve 210.

For reference, in the exemplary embodiment of the present invention, the adjustment of the bypass flow rate of the gaseous hydrogen $GH_2$ may include both a configuration in which the control valve 210 turns on or off the flow of the gaseous hydrogen $GH_2$ passing through the control valve 210 and a configuration in which the control valve 210 adjusts the flow rate of the gaseous hydrogen $GH_2$ passing through the control valve 210.

The controller 400 is provided to control the control valve 210 that selectively adjusts the bypass flow rate of the gaseous hydrogen flowing from the supply line 100 to the bypass line 200.

According to the exemplary embodiment of the present invention, the controller 400 may control the control valve 210 based on the internal pressure of the storage container 20.

As described above, in the exemplary embodiment of the present invention, the control valve 210 is controlled based on the internal pressure (e.g., the first pressure) of the storage container 20 such that the vaporization amount of the liquid hydrogen $LH_2$ (the internal pressure of the storage container) may be adjusted. Therefore, it is possible to accurately adjust the vaporization amount of the liquid hydrogen $LH_2$ based on the operation conditions of the fuel cell system 30.

Among other things, in the exemplary embodiment of the present invention, the gaseous hydrogen $GH_2$ may be vaporized from the liquid hydrogen $LH_2$ only to a level required by the hydrogen storage system 10, and the gaseous hydrogen $GH_2$ may be inhibited from being excessively supplied along the bypass line 200 (the heat quantity applied to the liquid hydrogen may be inhibited from being excessively increased). Therefore, it is possible to obtain an advantageous effect of inhibiting excessive increase in pressure in the storage container 20 (the excessive expansion of the storage container) caused by an excessive vaporization amount of the liquid hydrogen $LH_2$ and improving safety and reliability.

For example, when the internal pressure (e.g., the first pressure) of the storage container 20 is lower than a predetermined reference pressure, the controller 400 may adjust the bypass flow rate of the gaseous hydrogen $GH_2$ passing through the control valve 210 to a flow rate higher than a predetermined reference flow rate.

When the applied heat quantity Q is smaller than a predetermined reference heat quantity, the bypass flow rate of the gaseous hydrogen $GH_2$ passing through the control valve 210 may be adjusted to a flow rate higher than the predetermined reference flow rate.

As described above, it is possible to increase the heat quantity to be applied to the liquid hydrogen $LH_2$ by adjusting the bypass flow rate of the gaseous hydrogen $GH_2$ passing through the control valve 210 to the flow rate higher than the predetermined reference flow rate (e.g., by increasing an opening amount of the control valve). Therefore, it is possible to increase the vaporization amount of the liquid hydrogen $LH_2$ (the supply amount of the gaseous hydrogen to be supplied to the fuel cell system).

As various exemplary embodiments of the present invention, when the internal pressure (e.g., the first pressure) of the storage container 20 is higher than the reference pressure, the controller 400 may adjust the bypass flow rate of the gaseous hydrogen $GH_2$ passing through the control valve 210 to a flow rate lower than the predetermined reference flow rate.

When the heat quantity Q applied to the liquid hydrogen $LH_2$ by the gaseous hydrogen $GH_2$ is equal to or greater than the predetermined reference heat quantity, the controller 400 may adjust the bypass flow rate of the gaseous hydrogen $GH_2$ passing through the control valve 210 to the flow rate lower than the predetermined reference flow rate.

As described above, it is possible to decrease the heat quantity to be applied to the liquid hydrogen $LH_2$ by adjusting the bypass flow rate of the gaseous hydrogen $GH_2$ passing through the control valve 210 to the flow rate lower than the predetermined reference flow rate (e.g., by decreasing the opening amount of the control valve). Therefore, it is possible to decrease the vaporization amount of the liquid hydrogen $LH_2$ (the supply amount of the gaseous hydrogen to be supplied to the fuel cell system).

The gaseous hydrogen $GH_2$ flowing along the bypass line 200 may be introduced into the supply line 100 again, pressed (compressed) again by the compressor 130, and then supplied to the fuel cell system 30.

In the instant case, the controller 400 may control the control valve 210 based on a difference between the reference pressure and the internal pressure (e.g., the first pressure) of the storage container 20, performing feedback control that increases or decreases the supply amount (bypass flow rate) of the gaseous hydrogen $GH_2$ flowing to the storage container 20 or turns on or off the flow of the gaseous hydrogen $GH_2$ flowing to the storage container 20.

According to the exemplary embodiment of the present invention, the hydrogen storage system 10 may include a discharge line 160 connected to the storage container 20 and configured to discharge the gaseous hydrogen $GH_2$ to the outside, and discharge valves 162 provided in the discharge line 160 and configured to selectively open or close the discharge line 160.

For example, the discharge line 160 may be connected to the storage container 20 through the supply line 100 (e.g., connected to the supply line between the storage container and the shut-off valve). A typical valve configured for selectively turning on or off the flow of the gaseous hydrogen $GH_2$ discharged along the discharge line 160 may be used as the discharge valve 162.

When the internal pressure of the storage container 20 is equal to or greater than a preset operating pressure (a pressure at which the discharge valve begins to operate to open the discharge line), the discharge valve 162 is opened (turned on) such that the gaseous hydrogen $GH_2$ may be discharged to the outside through the discharge line 160.

In the exemplary embodiment of the present invention illustrated and described above, the example has been described in which the discharge line 160 is connected to the supply line 100. However, according to various exemplary embodiments of the present invention, the discharge line may be directly connected to the storage container.

According to various exemplary embodiments of the present invention, the controller 400 may control the control valve 210 based on the measurement result obtained by the flow rate measurement part 300.

As described above, the exemplary embodiment of the present invention may adjust the vaporization amount of the liquid hydrogen $LH_2$ (the internal pressure of the storage container) by controlling the control valve 210 based on the measurement result (the bypass flow rate of the gaseous hydrogen) obtained by the flow rate measurement part 300. Therefore, it is possible to accurately adjust the vaporization amount of the liquid hydrogen $LH_2$ based on the operation conditions of the fuel cell system 30.

Among other things, in the exemplary embodiment of the present invention, the gaseous hydrogen $GH_2$ may be vaporized from the liquid hydrogen $LH_2$ only to a level required by the hydrogen storage system 10, and the gaseous hydrogen $GH_2$ may be inhibited from being excessively supplied along the bypass line 200 (the heat quantity applied to the liquid hydrogen may be inhibited from being excessively increased). Therefore, it is possible to obtain an advantageous effect of inhibiting excessive increase in pressure in the storage container 20 (the excessive expansion of the storage container) caused by an excessive vaporization amount of the liquid hydrogen $LH_2$ and improving safety and reliability.

For example, when the pressure ratio (the pressure ratio between the first pressure of the gaseous hydrogen detected by the first pressure sensor and the second pressure of the gaseous hydrogen detected by the second pressure sensor) is lower than a predetermined reference pressure ratio, the controller 400 may adjust the bypass flow rate of the gaseous hydrogen $GH_2$ passing through the control valve 210 to the flow rate higher than the predetermined reference flow rate.

As described above, it is possible to increase the heat quantity to be applied to the liquid hydrogen $LH_2$ by adjusting the bypass flow rate of the gaseous hydrogen $GH_2$ passing through the control valve 210 to the flow rate higher than the predetermined reference flow rate (e.g., by increasing an opening amount of the control valve). Therefore, it is possible to increase the vaporization amount of the liquid hydrogen $LH_2$ (the supply amount of the gaseous hydrogen to be supplied to the fuel cell system).

As various exemplary embodiments of the present invention, when the pressure ratio is higher than the reference pressure ratio, the controller 400 may adjust the bypass flow rate of the gaseous hydrogen $GH_2$ passing through the control valve 210 to the flow rate lower than the predetermined reference flow rate.

As described above, it is possible to decrease the heat quantity to be applied to the liquid hydrogen $LH_2$ by adjusting the bypass flow rate of the gaseous hydrogen $GH_2$ passing through the control valve 210 to the flow rate lower than the predetermined reference flow rate (e.g., by decreasing the opening amount of the control valve). Therefore, it is possible to decrease the vaporization amount of the liquid hydrogen $LH_2$ (the supply amount of the gaseous hydrogen to be supplied to the fuel cell system).

Furthermore, the gaseous hydrogen $GH_2$ flowing along the bypass line 200 may be introduced into the supply line 100 again, pressed (compressed) again by the compressor 130, and then supplied to the fuel cell system 30. In the instant case, the controller 400 may control the control valve 210 based on the difference between the reference pressure ratio and the pressure ratio (the pressure ratio between the first pressure of the gaseous hydrogen detected by the first pressure sensor and the second pressure of the gaseous hydrogen detected by the second pressure sensor), performing the feedback control that increases or decreases the supply amount (bypass flow rate) of the gaseous hydrogen $GH_2$ flowing to the storage container 20 or turns on or off the flow of the gaseous hydrogen $GH_2$ flowing to the storage container 20.

According to various exemplary embodiments of the present invention, the controller 400 may control the control valve 210 based on the heat quantity Q applied to the liquid hydrogen $LH_2$ by the gaseous hydrogen $GH_2$ flowing to the bypass line 200.

For example, when the heat quantity Q applied to the liquid hydrogen $LH_2$ by the gaseous hydrogen $GH_2$ is smaller than the predetermined reference heat quantity, the controller 400 may adjust the bypass flow rate of the gaseous hydrogen $GH_2$ passing through the control valve 210 to the flow rate higher than the predetermined reference flow rate.

As described above, it is possible to increase the heat quantity to be applied to the liquid hydrogen $LH_2$ by adjusting the bypass flow rate of the gaseous hydrogen $GH_2$ passing through the control valve 210 to the flow rate higher than the predetermined reference flow rate (e.g., by increasing an opening amount of the control valve). Therefore, it is possible to increase the vaporization amount of the liquid hydrogen $LH_2$ (the supply amount of the gaseous hydrogen to be supplied to the fuel cell system).

As various exemplary embodiments of the present invention, when the heat quantity Q applied to the liquid hydrogen $LH_2$ by the gaseous hydrogen $GH_2$ is equal to or greater than the predetermined reference heat quantity, the controller 400 may adjust the bypass flow rate of the gaseous hydrogen $GH_2$ passing through the control valve 210 to the flow rate lower than the predetermined reference flow rate.

As described above, it is possible to decrease the heat quantity to be applied to the liquid hydrogen $LH_2$ by adjusting the bypass flow rate of the gaseous hydrogen $GH_2$ passing through the control valve 210 to the flow rate lower than the predetermined reference flow rate (e.g., by decreasing the opening amount of the control valve). Therefore, it is possible to decrease the vaporization amount of the liquid hydrogen $LH_2$ (the supply amount of the gaseous hydrogen to be supplied to the fuel cell system).

Meanwhile, according to the exemplary embodiment of the present invention, it is possible to minimize the discharge amount of the gaseous hydrogen $GH_2$ to be discharged from the storage container 20 by controlling the compressor 130 and the control valve 210 during a process of ending the operation of the fuel cell system 30 (or a process of ending the operation of the vehicle).

This is based on the fact that the density of the liquid hydrogen $LH_2$ increases as the pressure thereof decreases. It is possible to delay the increase in pressure caused by the vaporization of the liquid hydrogen $LH_2$ in a state in which the operation of the fuel cell system 30 is ended (e.g., a state in which the operation is stopped for a long time period) by increasing the density of the liquid hydrogen $LH_2$ by decreasing the internal pressure of the storage container 20 during the process of ending the operation of the fuel cell system 30. Therefore, it is possible to obtain an advantageous effect of minimizing the discharge amount of the gaseous hydrogen $GH_2$ caused by the increase in an internal pressure of the storage container 20.

Figure 3:
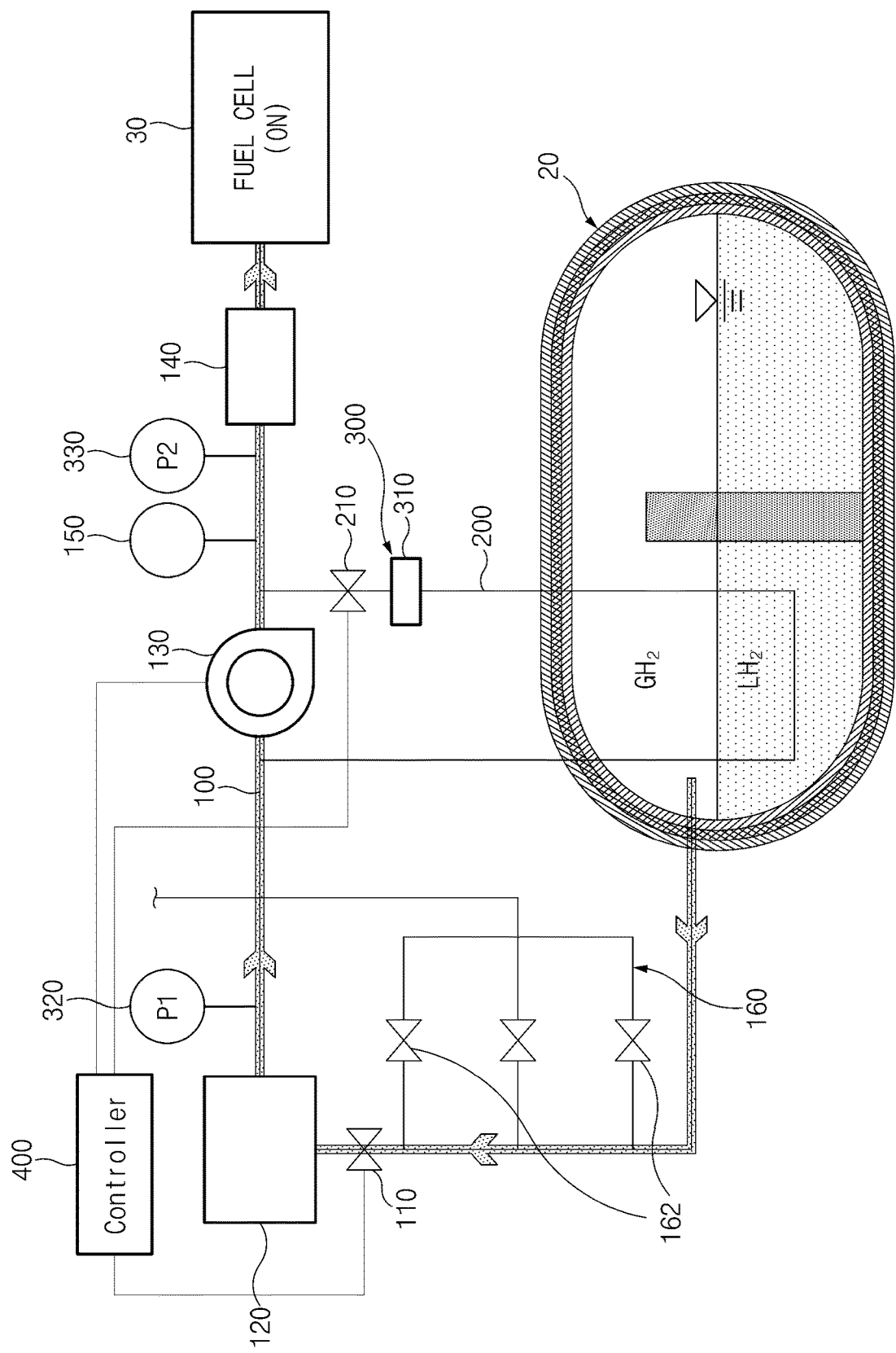
FIG. 3 is a view for explaining a flow of gaseous hydrogen when an input of an operation stop signal for a fuel cell system is detected in the hydrogen storage system according to the exemplary embodiment of the present invention.

For example, referring to FIG. 3, according to the exemplary embodiment of the present invention, when an input of an operation stop signal for the fuel cell system 30 is detected while the fuel cell system 30 operates, the operation of the fuel cell system 30 may be stopped when the condition is satisfied, in which the compressor 130 operates until the first pressure P1 of the gaseous hydrogen $GH_2$ becomes equal to or lower than a preset first target pressure in a state in which the control valve 210 closes the bypass line 200.

According to various exemplary embodiments of the present invention, when it is determined that the first pressure P1 of the gaseous hydrogen $GH_2$ is higher than the preset first target pressure before an operation of a high-level system (e.g., a system for starting the vehicle) of the hydrogen storage system 10 is ended (e.g., turned off), the compressor 130 may operate (the compressor may operate until the first pressure of the gaseous hydrogen becomes equal to or lower than the preset first target pressure) in the state in which the control valve 210 closes the bypass line 200.

The first target pressure may be variously changed in accordance with required conditions and design specifications. For example, the first target pressure may be defined as a pressure equal to or lower than the atmospheric pressure (a pressure lower than the internal pressure of the storage container while the fuel cell system normally operates).

The first target pressure may be defined as a pressure lower than a preset operating pressure at which the discharge valve begins to operate to open the discharge line. The first target pressure may be 90% or less of the operating pressure.

For example, the first target pressure may be defined as a low pressure equal to or similar to the atmospheric pressure. The first target pressure may be defined as a pressure lower than the internal pressure of the storage container while the fuel cell system normally operates.

As described above, when the input of the operation stop signal for the fuel cell system 30 is detected, the compressor 130 may operate until the first pressure P1 of the gaseous hydrogen $GH_2$ becomes equal to or lower than the preset first target pressure (e.g., becomes equal to or lower than atmospheric pressure) in the state in which the control valve 210 closes the bypass line 200, improving the density of the liquid hydrogen $LH_2$ stored in the storage container 20. Therefore, the increase in pressure in the storage container caused by the vaporization of the liquid hydrogen $LH_2$ is delayed as the ullage space in the storage container increases.

Furthermore, it is possible to increase a difference between the internal pressure of the storage container 20 and the operating pressure of the discharge valve (the operating pressure at which the discharge valve begins to operate to open the discharge line). Therefore, it is possible to obtain an advantageous effect of delaying the time it takes for the internal pressure of the storage container 20 to reach the operating pressure of the discharge valve by the natural vaporization of the liquid hydrogen $LH_2$ (e.g., the vaporization of the liquid hydrogen caused by the difference in temperature between the inside and the outside of the storage container). Consequently, it is possible to obtain an advantageous effect of maximally delaying the time required to discharge the gaseous hydrogen $GH_2$ to the outside of the storage container 20 and minimizing the discharge amount of the gaseous hydrogen $GH_2$.

The operation of the compressor 130 may be stopped when the second pressure P2 of the gaseous hydrogen $GH_2$ is equal to or greater than the first target pressure while the compressor 130 operates.

The first target pressure may be defined as a pressure lower than the preset operating pressure at which the discharge valve begins to operate (operate to open the discharge line).

For reference, the liquid hydrogen $LH_2$ or the gaseous hydrogen $GH_2$, which is discharged to the outside of the storage container 20 by the operation of the compressor 130 for decreasing the internal pressure of the storage container 20, may be supplied to the fuel cell system 30 and used to generate electricity for charging a battery or operating a heater or an air conditioner. Alternatively, the supply line 100 or the fuel cell system 30 may be filled with the gaseous hydrogen $GH_2$ discharged to the outside of the storage container 20.

The remaining amount HGR of the gaseous hydrogen $GH_2$ remaining in the storage container 20 at a point in time at which the operation of the fuel cell system 30 is stopped is determined based on the internal pressure of the storage container 20 and the remaining amount (liquid hydrogen level) of the liquid hydrogen $LH_2$ before the operation of the compressor 130 for decreasing the internal pressure of the storage container 20 starts. Therefore, it is possible to obtain an advantageous effect of inhibiting a rapid decrease in supply pressure of the gaseous hydrogen $GH_2$ to be supplied to the fuel cell system 30 and inhibiting hydrogen starvation in the fuel cell system 30.

The remaining amount HGR of the gaseous hydrogen $GH_2$ remaining in the storage container 20 at the point in time at which the operation of the fuel cell system 30 is stopped may satisfy the following Equation 2.

$$HGR = f(HCL, CP) \times P1 \times \text{Density Coefficient of Liquid Hydrogen} \quad \text{[Equation 2]}$$

(herein, f represents a function of an occupation volume of the gaseous hydrogen in the storage container determined by a capacity CP of the storage container and a liquid level HCL of the liquid hydrogen, and P1 represents the first pressure of the gaseous hydrogen measured by the first pressure sensor.)

For example, in a case in which the storage container has a cylindrical shape having a circular cross-section and the storage container is disposed in a vertical direction, f may satisfy the following Equation 3. In a case in which the storage container is disposed in a horizontal direction, f may satisfy the following Equation 4.

$$f = CP/h \times (h - HCL) \quad \text{[Equation 3]}$$

(herein, HCL represents a liquid level (%) of the liquid hydrogen, CP represents a capacity of the storage container, and h represents a height of the storage container in the vertical direction.)

$$f = CP - l\left(r^2 \cos^{-1}\left(\frac{r - HCL}{r}\right) - (r - HCL)\sqrt{2rHCL - HCL^2}\right) \quad \text{[Equation 4]}$$

(herein, HCL represents a liquid level (%) of the liquid hydrogen, CP represents a capacity of the storage container, r represents a diameter of the storage container, and L represents a length of the storage container in the horizontal direction thereof.)

For reference, the following Table 1 shows density coefficients for the pressures of the liquid hydrogen.

TABLE 1

Density Coefficients for Pressures of Liquid Hydrogen

| Pressure (bar) | Density (g/ml, 20K) |
|---|---|
| 1 | 0.071279 |
| 2 | 0.071411 |
| 3 | 0.071541 |
| 4 | 0.07167 |
| 5 | 0.071797 |
| 6 | 0.071922 |
| 7 | 0.072046 |
| 8 | 0.072168 |
| 9 | 0.072288 |
| 10 | 0.072407 |
| 11 | 0.072525 |
| 12 | 0.072641 |

Furthermore, according to the exemplary embodiment of the present invention, the compressor 130 and the control valve 210 may be controlled during the process in which the operation of the fuel cell system 30 restarts (or the vehicle starts) after the operation of the fuel cell system 30 is ended, rapidly generating a sufficient pressure in the storage container 20 at a point in time at which the fuel cell system 30 begins to operate.

That is, as heat is introduced into the storage container 20, the internal pressure of the storage container 20 is finely increased by the natural vaporization of the liquid hydrogen $LH_2$ (e.g., the vaporization of the liquid hydrogen by the difference in temperature between the inside and the outside of the storage container). After the operation of the fuel cell system 30 is ended, the internal pressure of the storage container 20 varies, at a point in time at which the fuel cell system 30 begins to operate again, depending on the elapsed time from the end portion of the operation, the outside temperature, and the thermal insulation performance of the storage container 20.

In the exemplary embodiment of the present invention, the compressor 130 operates based on the internal pressure of the storage container 20 during the process in which the fuel cell system 30 begins to operate again. Therefore, it is possible to obtain an advantageous effect of more rapidly generating a sufficient pressure in the storage container 20 at the point in time at which the fuel cell system 30 begins to operate again.

Figure 4:
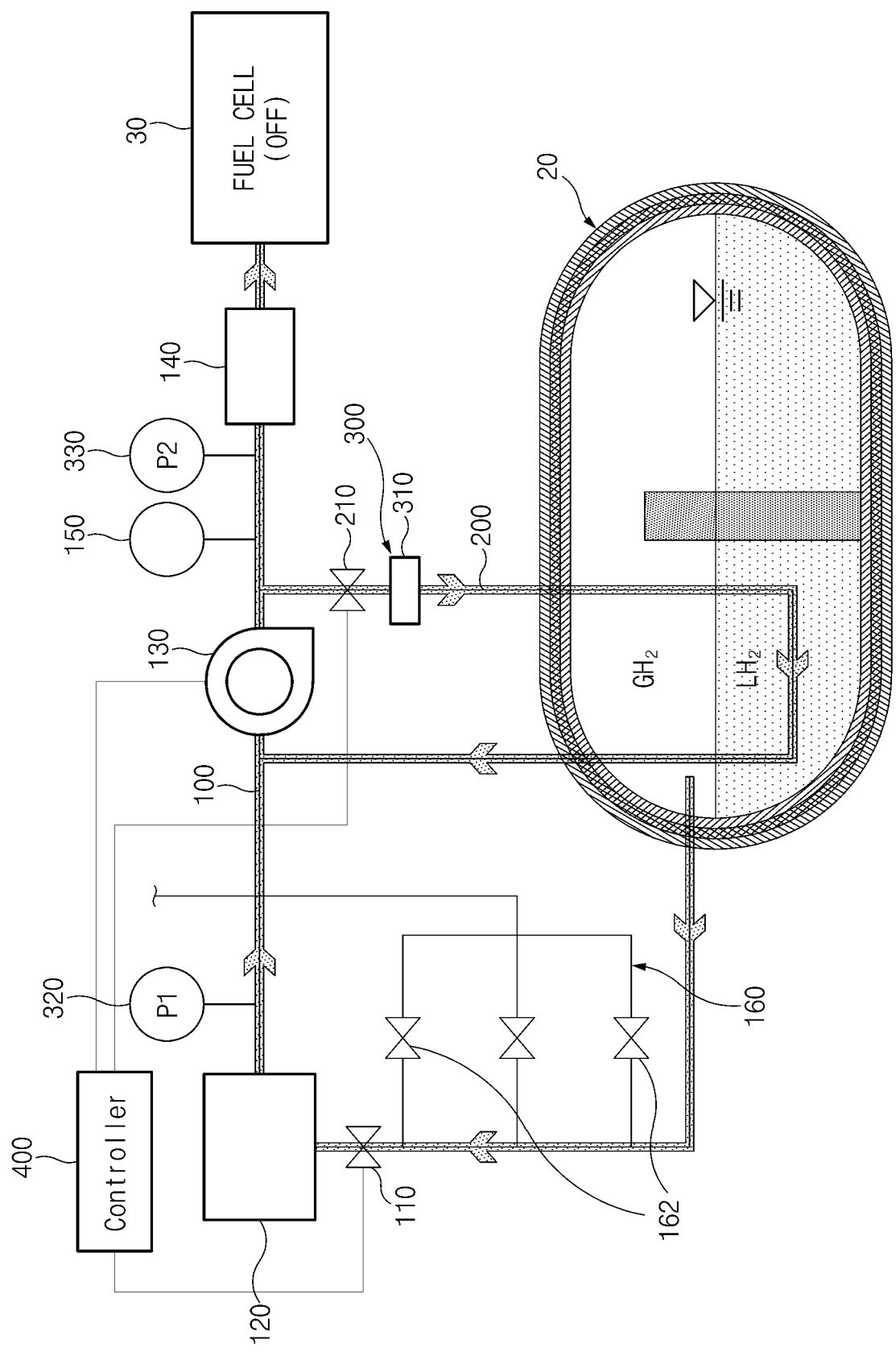
FIG. 4 is a view for explaining a flow of gaseous hydrogen when an input of an operation start signal for the fuel cell system is detected in the hydrogen storage system according to the exemplary embodiment of the present invention.

For example, referring to FIG. 4, according to the exemplary embodiment of the present invention, when an input of an operation start signal for the fuel cell system 30 is detected while the operation of the fuel cell system 30 is stopped and it is determined that the first pressure P1 of the gaseous hydrogen $GH_2$ is lower than a preset second target pressure, the fuel cell system 30 may operate when the condition is satisfied, in which compressor 130 operates until the first pressure P1 of the gaseous hydrogen $GH_2$ becomes equal to or greater than the second target pressure in a state in which the control valve 210 opens the bypass line 200.

As described above, when the input of the operation start signal for the fuel cell system 30 is detected, the compressor 130 may operate until the first pressure P1 of the gaseous hydrogen $GH_2$ becomes equal to or greater than the preset second target pressure in the state in which the shut-off valve 110 opens the supply line 100 and the control valve 210 opens the bypass line 200, increasing the internal pressure of the storage container 20. Therefore, it is possible to obtain an advantageous effect of more rapidly generating the sufficient pressure in the storage container 20 at the point in time at which the fuel cell system 30 begins to operate again (the sufficient pressure which may stably supply the gaseous hydrogen to the fuel cell system immediately after the operation of the fuel cell system starts).

According to various exemplary embodiments of the present invention, when the operation start signal (e.g., the turn-on signal) for the high-level system (e.g., the system for starting the vehicle) of the hydrogen storage system 10 is detected and it is determined that the first pressure P1 of the gaseous hydrogen $GH_2$ is lower than the preset second target pressure, the fuel cell system 30 may operate after the compressor 130 operates (the compressor operates until the first pressure of the gaseous hydrogen becomes equal to or greater than the second target pressure) in the state in which the control valve 210 opens the bypass line 200.

Furthermore, when the operation start signal (e.g., the turn-on signal) for the high-level system (e.g., the system for starting the vehicle) of the hydrogen storage system 10 is detected, the fuel cell system 30 may also operate at the same time of the operation of the compressor 130. However, when it is determined that the first pressure P1 of the gaseous hydrogen GHz is lower than the preset second target pressure, the control valve 210 may open the bypass line 200, and at the same time, the operation of the fuel cell system 30 may be stopped. The operation of the fuel cell system 30 may start when the condition in which the internal pressure (e.g., the first pressure) of the storage container 20 becomes equal to or greater than the second target pressure is satisfied.

In the exemplary embodiment of the present invention illustrated and described above, the example has been described in which the gaseous hydrogen GHz flowing through the bypass line 200 passes through the inside of the storage container 20 and then be supplied to the supply line 100 again. However, according to various exemplary embodiments of the present invention, the gaseous hydrogen GHz flowing through the bypass line 200 may be supplied directly into the storage container 20.

Figure 5:
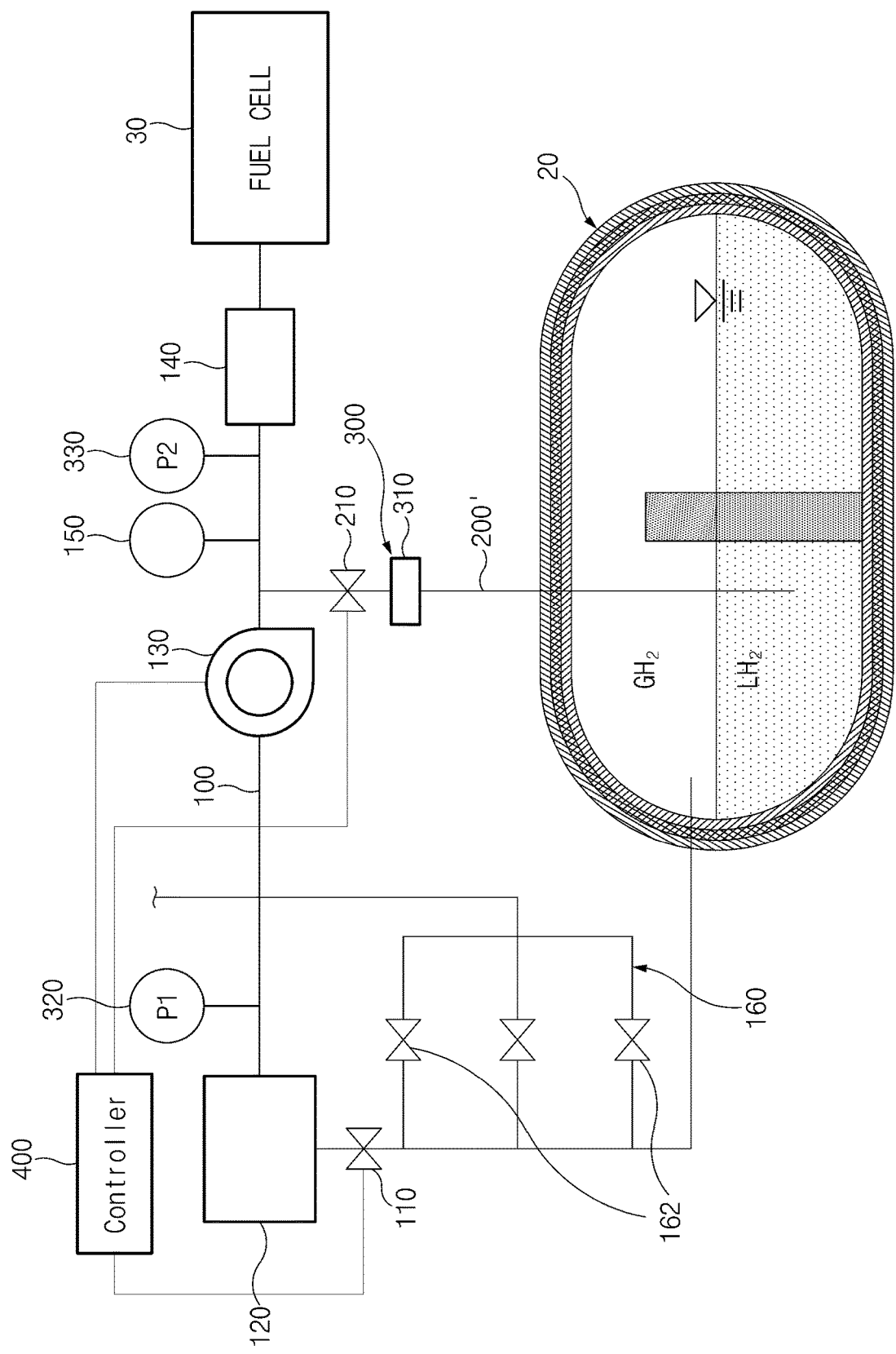
FIG. 5 is a view for explaining a modified example of a bypass line in the hydrogen storage system according to the exemplary embodiment of the present invention.

FIG. 5 is a view for explaining a modified example of the bypass line 200 in the hydrogen storage system 10 according to the exemplary embodiment of the present invention. Furthermore, the parts identical and equivalent to the parts in the above-mentioned configuration will be designated by the identical or equivalent reference numerals, and detailed descriptions thereof will be omitted.

Referring to FIG. 5, according to the exemplary embodiment of the present invention, the bypass line 200 has an approximately "I" shape. One end portion of the bypass line 200 may be connected to the supply line 100 between the compressor 130 and the fuel cell system 30, and the other end portion of the bypass line 200 may be exposed to the inside of the storage container 20 (e.g., spaced from an internal wall surface of the storage container).

Therefore, the gaseous hydrogen $GH_2$ flowing to the bypass line 200 may be supplied (sprayed) directly into the storage container 20 through the other end portion (the outlet end) of the bypass line 200 exposed to the inside of the storage container 20.

As described above, in the exemplary embodiment of the present invention, the gaseous hydrogen $GH_2$ is sprayed directly into the storage container 20. Therefore, it is possible to obtain an advantageous effect of further improving the efficiency in heating the liquid hydrogen $LH_2$ with the gaseous hydrogen $GH_2$ and sufficiently ensuring the vaporization amount of the liquid hydrogen $LH_2$ even in case of decreasing the bypass flow rate of the gaseous hydrogen $GH_2$ flowing to the storage container 20.

Moreover, according to the exemplary embodiment of the present invention, since the bypass line 200 has an "I" shape, it is possible to minimize the number of mounting holes penetrating the wall surface of the storage container 20 to mount the bypass line 200 (only a single mounting hole may be provided). Therefore, it is possible to obtain an advantageous effect of minimizing the deterioration in thermal insulation performance of the storage container 20 caused by the increase in number of mounting holes.

The bypass line 200 may be variously changed in structure and shape in accordance with required conditions and design specifications, and the present invention is not restricted or limited by the structure and shape of the bypass line 200.

For example, the bypass line 200 may be provided in a form of a straight tube. According to various exemplary embodiments of the present invention, the bypass line may be provided in a form of a curved tube.

According to the exemplary embodiment of the present invention, the control valve 210 and the orifice may be provided in the bypass line 200 even in the case in which the bypass line 200 has an "I" shape. According to various exemplary embodiments of the present invention, an injector having a combination of functions of the control valve 210 and the orifice may be used instead of the control valve 210 and the orifice.

Hereinafter, a method of controlling the hydrogen storage system according to the exemplary embodiment of the present invention will be described.

Figure 6:
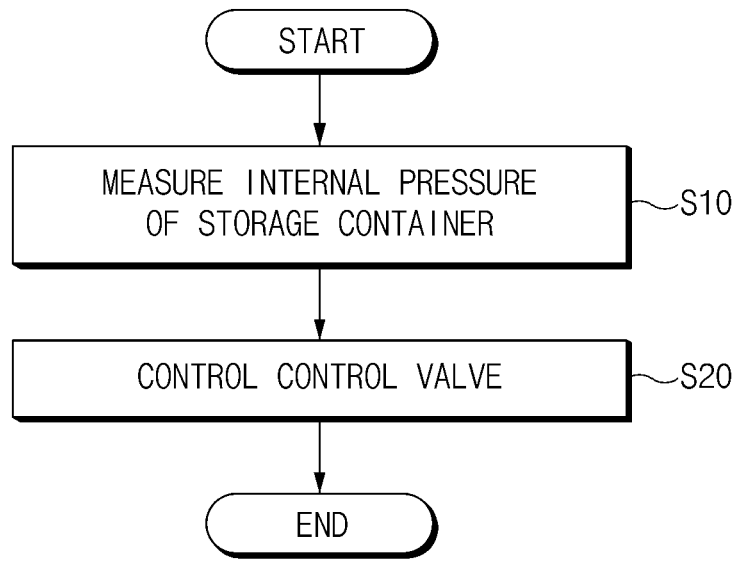
FIG. 6, FIG. 7, and FIG. 8 are flowcharts for explaining a method of controlling the hydrogen storage system according to the exemplary embodiment of the present invention.
Figure 7:
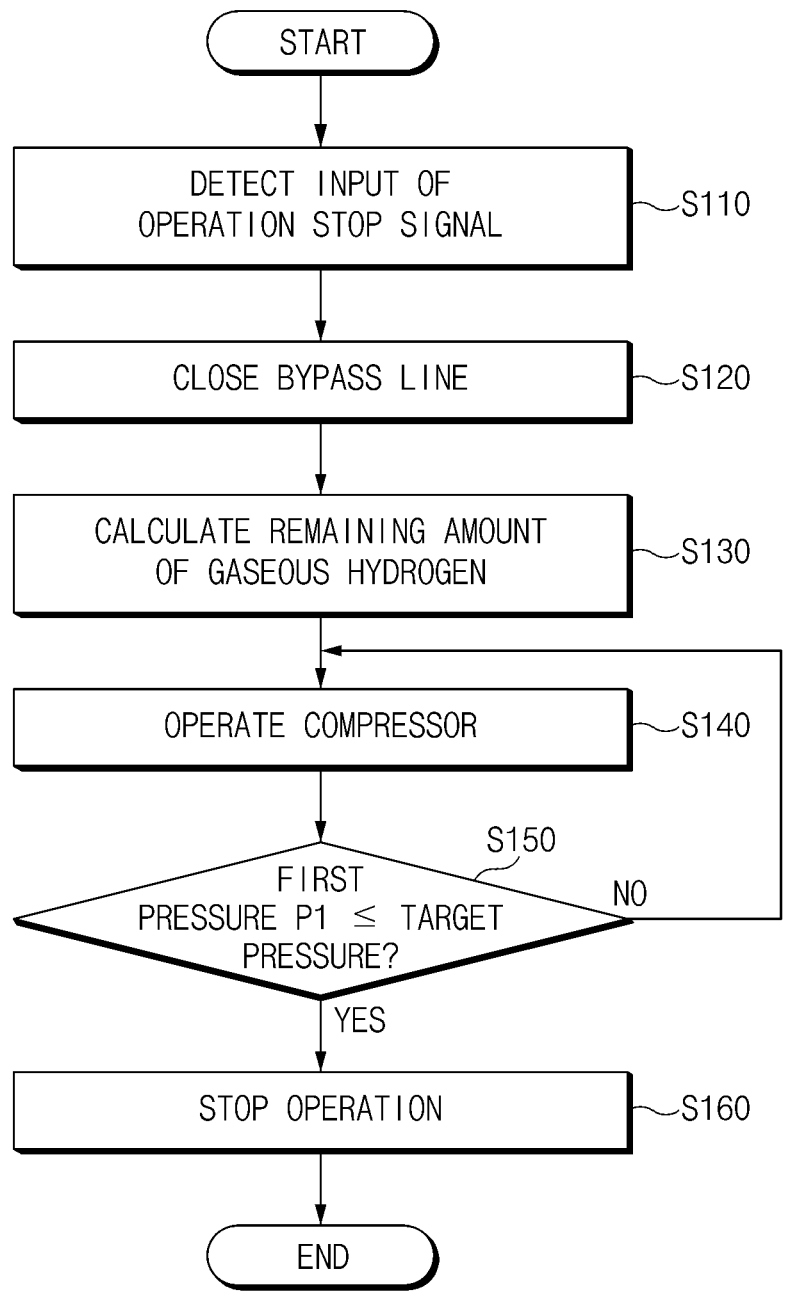
Figure 8:
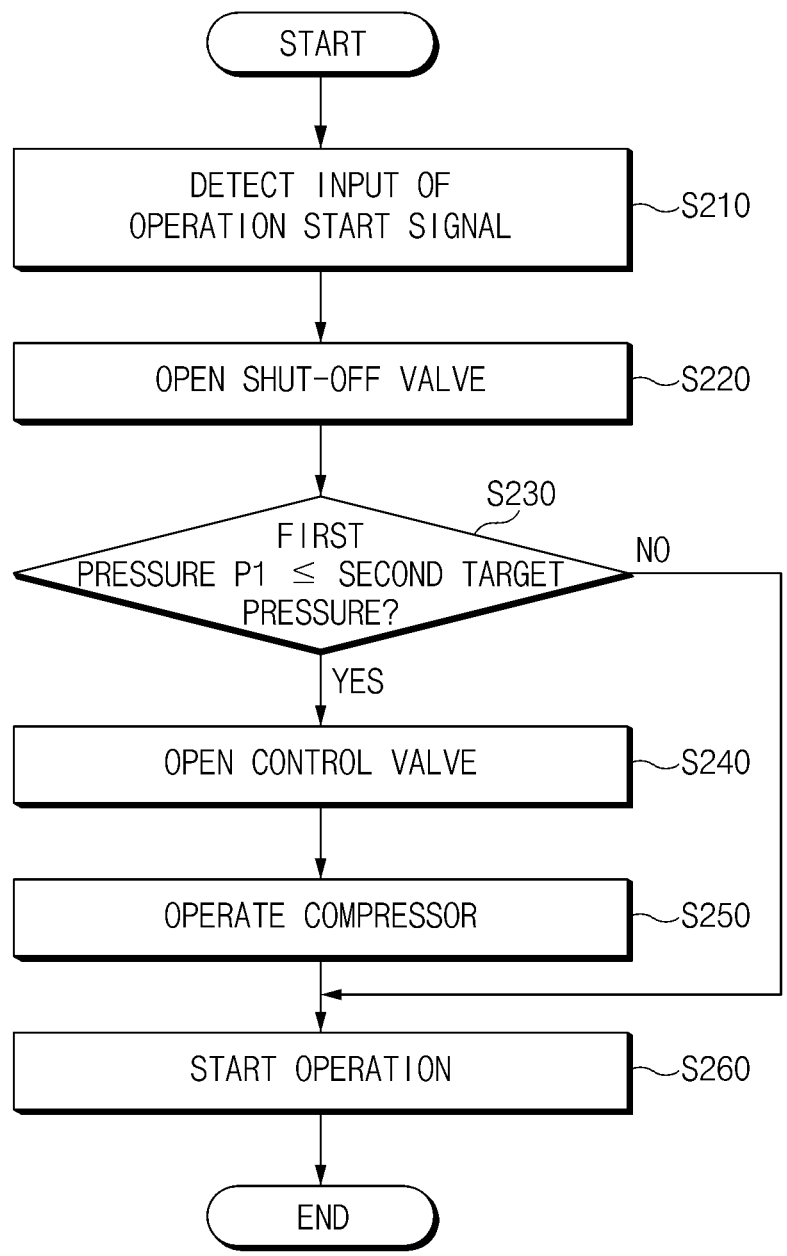

FIG. 6, FIG. 7, and FIG. 8 are flowcharts for explaining a method of controlling the hydrogen storage system according to the exemplary embodiment of the present invention. Furthermore, the parts identical and equivalent to the parts in the above-mentioned configuration will be designated by the identical or equivalent reference numerals, and detailed descriptions thereof will be omitted.

Referring to FIGS. 6 to 8, the method controls the hydrogen storage system 10 according to the exemplary embodiment of the present invention including: the storage container 20 configured to store liquid hydrogen $LH_2$; the supply line 100 having one end portion connected to the storage container 20 and the other end portion connected to the fuel cell system 30, the supply line 100 being configured to supply gaseous hydrogen GHz from the storage container 20 to the fuel cell system 30; the compressor 130 provided in the supply line 100 and configured to compress the gaseous hydrogen $GH_2$; the bypass line 200 configured to connect the supply line 100 and the storage container 20 and allow the gaseous hydrogen GHz to flow to the storage container 20 from the supply line 100; the flow rate measurement part 300 configured to measure the bypass flow rate of the gaseous hydrogen GHz flowing from the supply line 100 to the bypass line 200; the control valve 210 provided in the bypass line 200 and configured to selectively adjust the bypass flow rate of the gaseous hydrogen $GH_2$; the orifice 310 provided in the bypass line 200 and positioned at the downstream side of the control valve 210; and the controller 400 configured to control the control valve 210 based on the measurement result obtained by the flow rate measurement part 300. The method may include a measurement step S10 of measuring the internal pressure of the storage container 20; and a control step S20 of controlling the control valve 210 based on a measurement result obtained by the measurement step S10.

STEP 1:

First, the internal pressure of the storage container 20 is measured (S10).

In the measurement step S10, the internal pressure of the storage container 20 may be measured in various ways in accordance with required conditions and design specifications.

For example, in the measurement step S10, the internal pressure of the storage container 20 may be measured using the first pressure sensor 320 provided in the supply line 100 and disposed between the compressor 130 and the storage container 20.

STEP 2:

Next, the control valve 210 is controlled based on the measurement result obtained in the measurement step S10 (S20).

In the control step S20, it is possible to adjust the vaporization amount of the liquid hydrogen $LH_2$ (the internal pressure of the storage container) by controlling the control valve 210 based on the measurement result (the internal pressure of the storage container) obtained in the measurement step S10. Therefore, it is possible to accurately adjust the vaporization amount of the liquid hydrogen $LH_2$ based on the operation conditions of the fuel cell system 30.

For example, in the control step S20, when the internal pressure (e.g., the first pressure) of the storage container 20 is lower than a predetermined reference pressure, it is possible to adjust the bypass flow rate of the gaseous hydrogen $GH_2$ passing through the control valve 210 to a flow rate higher than a predetermined reference flow rate.

As various exemplary embodiments of the present invention, in the control step S20, when the internal pressure (e.g., the first pressure) of the storage container 20 is higher than the reference pressure, it is possible to adjust the bypass flow rate of the gaseous hydrogen $GH_2$ passing through the control valve 210 to a flow rate lower than the predetermined reference flow rate.

In the control step S20, the compression ratio of the compressor 130 may be 1.9 or more.

Since the compression ratio of the compressor 130 is 1.9 or more as described above, the pressure ratio between the pressure at the upstream side of the orifice 310 and the pressure at the downstream side of the orifice 310 may be 1.9 or more such that the choked flow may be generated around the orifice 310. Therefore, it is possible to obtain an advantageous effect of more precisely controlling the bypass flow rate of the gaseous hydrogen flowing along the bypass line.

According to various exemplary embodiments of the present invention, the method of controlling the hydrogen storage system may control the control valve 210 based on the bypass flow rate of the gaseous hydrogen $GH_2$ flowing to the bypass line 200 from the supply line 100.

The bypass flow rate of the gaseous hydrogen $GH_2$ flowing to the bypass line 200 from the supply line 100 may be measured in various ways in accordance with required conditions and design specifications.

For example, the bypass flow rate of the gaseous hydrogen $GH_2$ flowing to the bypass line 200 from the supply line 100 may be measured by the flow rate measurement part 300. The flow rate measurement part 300 includes: the first pressure sensor 320 provided in the supply line 100, disposed between the compressor 130 and the storage container 20, and configured to measure the pressure of the gaseous hydrogen $GH_2$ at the upstream side of the compressor 130; and the second pressure sensor 330 provided in the supply line 100, disposed between the compressor 130 and the fuel cell system 30, and configured to measure the pressure of the gaseous hydrogen $GH_2$ at the downstream side of the compressor 130.

The bypass flow rate of the gaseous hydrogen $GH_2$ may be measured based on the pressure ratio between the first pressure P1 of the gaseous hydrogen $GH_2$ measured by the first pressure sensor 320 and the second pressure P2 of the gaseous hydrogen $GH_2$ measured by the second pressure sensor 330.

That is, when the choked flow is generated in the bypass line 220 by the orifice 310 having a predetermined cross-sectional area, the flow rate of the gaseous hydrogen $GH_2$ may be limited at the downstream side of the orifice 310 even though the pressure at the downstream side of the orifice 310 decreases. Therefore, a linear relationship may be made between the flow rate and the pressure ratio (the pressure at the upstream side of the orifice/the pressure at the downstream side of the orifice) between the pressure at the upstream side of the orifice 310 and the pressure at the downstream side of the orifice 310. For example, the flow rate (bypass flow rate) of the gaseous hydrogen $GH_2$ passing through the orifice 310 may be linearly increased in a response to the increase in pressure ratio.

As described above, the linear relationship may be made between the flow rate and the pressure ratio between the pressure at the upstream side of the orifice 310 and the pressure at the downstream side of the orifice 310. Therefore, the flow rate of the gaseous hydrogen $GH_2$ (the bypass flow rate of the gaseous hydrogen) passing through the orifice 310 may be determined by obtaining the first pressure P1 of the gaseous hydrogen $GH_2$ measured by the first pressure sensor 320 (the pressure at the downstream side of the orifice) and the second pressure P2 of the gaseous hydrogen $GH_2$ measured by the second pressure sensor 330 (the pressure at the upstream side of the orifice).

In the instant case, the first pressure P1 is an inlet pressure of the compressor 130 and corresponds to the internal pressure of the storage container 20 and the pressure at the downstream side of the orifice 310. Furthermore, the second pressure P2 is an outlet pressure of the compressor 130 and corresponds to the pressure at the upstream side of the orifice 310.

When the bypass flow rate of the gaseous hydrogen $GH_2$ flowing to the bypass line 200 from the supply line 100 is measured, it is possible to adjust the vaporization amount of the liquid hydrogen $LH_2$ (the internal pressure of the storage container) by controlling the control valve 210 based on the measurement result (the bypass flow rate of the gaseous hydrogen). Therefore, it is possible to accurately adjust the vaporization amount of the liquid hydrogen $LH_2$ based on the operation conditions of the fuel cell system 30.

For example, when the pressure ratio (the pressure ratio between the first pressure of the gaseous hydrogen measured by the first pressure sensor and the second pressure of the gaseous hydrogen measured by the second pressure sensor) is lower than a predetermined reference pressure ratio, it is possible to adjust the bypass flow rate of the gaseous hydrogen $GH_2$ passing through the control valve 210 to the flow rate higher than the predetermined reference flow rate.

As various exemplary embodiments of the present invention, in the control step S20, when the pressure ratio is higher than the reference pressure ratio, it is possible to adjust the bypass flow rate of the gaseous hydrogen $GH_2$ passing through the control valve 210 to the flow rate lower than the predetermined reference flow rate.

According to various exemplary embodiments of the present invention, the method of controlling the hydrogen storage system may control the control valve 210 based on the heat quantity Q applied to the liquid hydrogen $LH_2$ by the gaseous hydrogen $GH_2$ flowing to the bypass line 200.

For example, when the heat quantity Q applied to the liquid hydrogen $LH_2$ by the gaseous hydrogen $GH_2$ is smaller than the predetermined reference heat quantity, it is possible to adjust the bypass flow rate of the gaseous hydrogen $GH_2$ passing through the control valve 210 to the flow rate higher than the predetermined reference flow rate.

As various exemplary embodiments of the present invention, when the heat quantity Q applied to the liquid hydrogen $LH_2$ by the gaseous hydrogen $GH_2$ is equal to or greater than the predetermined reference heat quantity, it is possible to adjust the bypass flow rate of the gaseous hydrogen $GH_2$ passing through the control valve 210 to the flow rate lower than the predetermined reference flow rate.

Furthermore, according to the exemplary embodiment of the present invention, it is possible to minimize the discharge amount of the gaseous hydrogen $GH_2$ to be discharged from the storage container 20 by controlling the compressor 130 and the control valve 210 during a process of ending the operation of the fuel cell system 30 (or a process of ending the operation of the vehicle).

For example, referring to FIGS. 3 and 7, according to the exemplary embodiment of the present invention, when the input of the operation stop signal for the fuel cell system 30 is detected (S110) while the fuel cell system 30 operates, the compressor 130 operates (S140) in the state in which the control valve 210 closes the bypass line 200 (S120). The operation of the fuel cell system 30 may be stopped (S160) when the condition is satisfied (S150), in which the compressor 130 operates until the first pressure P1 of the gaseous hydrogen $GH_2$ becomes equal to or lower than a preset first target pressure in a state in which the control valve 210 closes the bypass line 200.

Furthermore, according to the exemplary embodiment of the present invention, the method of controlling the hydrogen storage system may include a step S130 of determining the remaining amount HGR of the gaseous hydrogen $GH_2$ remaining in the storage container 20 at the point in time at which the operation of the fuel cell system 30 is stopped based on the internal pressure of the storage container 20 and the remaining amount (liquid hydrogen level) of the liquid hydrogen $LH_2$ before the operation of the compressor 130 for decreasing the internal pressure of the storage container 20 starts (S140).

Furthermore, according to the exemplary embodiment of the present invention, the compressor 130 and the control valve 210 may be controlled during the process in which the operation of the fuel cell system 30 restarts (or the vehicle starts) after the operation of the fuel cell system 30 is ended, rapidly generating a sufficient pressure in the storage container 20 at a point in time at which the fuel cell system 30 begins to operate.

For example, referring to FIGS. 4 and 8, according to the exemplary embodiment of the present invention, when the input of the operation start signal for the fuel cell system 30 is detected (S210) while the operation of the fuel cell system 30 is stopped, the shut-off valve 110 opens the supply line 100 (S220). When it is determined that the first pressure P1 of the gaseous hydrogen $GH_2$ is lower than the preset second target pressure (S230), the fuel cell system 30 may operate (S260) when the condition is satisfied (S250) in which compressor 130 operates until the first pressure P1 of the gaseous hydrogen $GH_2$ becomes equal to or greater than the second target pressure in a state in which the control valve 210 opens the bypass line 200 (S240).

For reference, the method of controlling the hydrogen storage system according to the exemplary embodiment of the present invention may be implemented by a typical determining system.

For example, the determining system may include one or more processors connected through a system bus, a memory, a user interface input device, a user interface output device, a storage, and a network interface.

The processor may be a central processing unit (CPU) or a semiconductor device that processes instructions stored in a memory and/or a storage.

The memory and the storage may include various types of volatile or non-volatile storage media. For example, the memory may include a read only memory (ROM) and a random access memory (RAM).

Therefore, the method or steps of algorithm described with reference to the exemplary embodiments included in the exemplary embodiment may be implemented directly by a hardware module, a software module, or a combination thereof which is executed by the processor. The software module may be provided in a storage medium (i.e., a memory and/or a storage) such as a RAM memory, a flash memory, a ROM memory, an EPROM memory, an EEPROM memory, a register, a hard disc, a mountable disc, and a CD-ROM.

For example, the storage medium may be coupled to the processor. The processor may read out information from the storage medium and write information to the storage medium.

As various exemplary embodiments of the present invention, the storage medium may be integrated with the processor. The processor and the storage medium may be provided in an application-specific integrated circuit (ASIC). For example, the ASIC may be provided in a user terminal. Alternatively, the processor and the storage medium may be provided as individual components in the user terminal.

According to the exemplary embodiment of the present invention described above, it is possible to obtain an advantageous effect of accurately adjusting the supply amount of the hydrogen to be supplied to the fuel cell system based on the operation conditions of the fuel cell system.

According to the exemplary embodiment of the present invention, it is possible to obtain an advantageous effect of accurately adjusting the supply amount of liquid hydrogen stored in the storage container and the pressure in the storage container based on the operation conditions of the fuel cell system.

Furthermore, according to the exemplary embodiment of the present invention, it is possible to obtain an advantageous effect of inhibiting the excessive vaporization of the liquid hydrogen and inhibiting the excessive increase in pressure in the storage container (the excessive expansion of the storage chamber).

Furthermore, according to the exemplary embodiment of the present invention, it is possible to obtain an advantageous effect of improving the efficiency in storing hydrogen and more rapidly supplying the hydrogen (supplying the fuel cell system with hydrogen at an increased hydrogen supply reaction speed).

Among other things, according to the exemplary embodiment of the present invention, it is possible to obtain an advantageous effect of actively controlling the pressure of the stored liquid hydrogen and improving the control range of the pressure in the storage container and the control response speed.

Furthermore, according to the exemplary embodiment of the present invention, it is possible to obtain an advantageous effect of minimizing the discharge amount of hydrogen and delaying the time required to discharge the hydrogen to the outside of the hydrogen storage system including the hydrogen storage container, the connection tube, and the valve under the condition in which the hydrogen stored in the storage container is not supplied to the fuel cell system.

Furthermore, according to the exemplary embodiment of the present invention, it is possible to obtain an advantageous effect of increasing the supply flow rate of the hydrogen, increasing the pressure range of the hydrogen, and improving energy efficiency.

Furthermore, according to the exemplary embodiment of the present invention, it is possible to obtain an advantageous effect of rapidly increasing the internal pressure of the storage container based on the operation conditions of the fuel cell system, decreasing the load of the compressor, and improving output reactivity and efficiency of the system.

Furthermore, according to the exemplary embodiment of the present invention, it is possible to obtain an advantageous effect of improving stability and reliability.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A hydrogen storage system comprising:
   a storage container configured to store liquid hydrogen;
   a supply line having a first end portion connected to the storage container and a second end portion connected to a fuel cell system, the supply line being configured to supply gaseous hydrogen to the fuel cell system from the storage container;
   a compressor mounted in the supply line and configured to compress the gaseous hydrogen;

a bypass line connecting the supply line and the storage container and configured to allow the gaseous hydrogen to flow from the supply line to the storage container;

a control valve mounted in the bypass line and configured to selectively adjust a bypass flow rate of the gaseous hydrogen;

an orifice provided in the bypass line and positioned at a downstream side of the control valve; and a controller electrically connected to the control valve and the compressor and configured to control the control valve and the compressor.

2. The hydrogen storage system of claim 1, wherein the controller is configured to control the compressor and the control valve according to an internal pressure of the storage container.

3. The hydrogen storage system of claim 2, wherein the controller is configured to adjust the bypass flow rate of the gaseous hydrogen passing through the control valve to a flow rate higher than a predetermined reference flow rate when the internal pressure of the storage container is lower than a predetermined reference pressure, and wherein the controller is configured to adjust the bypass flow rate of the gaseous hydrogen passing through the control valve to a flow rate lower than the predetermined reference flow rate when the internal pressure of the storage container is higher than the reference pressure.

4. The hydrogen storage system of claim 2, wherein the compressor is configured to adjust a compression ratio of the compressor is 1.9 or more.

5. The hydrogen storage system of claim 1, including:

a flow rate measurement part configured to measure the bypass flow rate of the gaseous hydrogen flowing to the bypass line from the supply line, wherein the controller is configured to control the control valve according to a measurement result obtained by the flow rate measurement part.

6. The hydrogen storage system of claim 5, wherein the flow rate measurement part includes:

a first pressure sensor provided in the supply line, disposed between the compressor and the storage container, and configured to measure a pressure of the gaseous hydrogen at an upstream side of the compressor; and a second pressure sensor provided in the supply line, disposed between the compressor and the fuel cell system, and configured to measure a pressure of the gaseous hydrogen at a downstream side of the compressor, and wherein the flow rate measurement part measures the bypass flow rate of the gaseous hydrogen according to a pressure ratio between a first pressure of the gaseous hydrogen measured by the first pressure sensor and a second pressure of the gaseous hydrogen measured by the second pressure sensor.

7. The hydrogen storage system of claim 6, wherein the controller is configured to adjust the bypass flow rate of the gaseous hydrogen passing through the control valve to a flow rate higher than a predetermined reference flow rate when the pressure ratio is lower than a predetermined reference pressure ratio, and wherein the controller is configured to adjust the bypass flow rate of the gaseous hydrogen passing through the control valve to a flow rate lower than the predetermined reference flow rate when the pressure ratio is higher than the reference pressure ratio.

8. The hydrogen storage system of claim 6, including:

a temperature sensor provided in the supply line, disposed between the compressor and the fuel cell system, and configured to measure a temperature of the gaseous hydrogen at the downstream side of the compressor.

9. The hydrogen storage system of claim 8, wherein a heat quantity Q applied to the liquid hydrogen by the gaseous hydrogen flowing to the bypass line is defined by the following Equation 1, $$Q = C_1 \times (P2 - P1) \times (T - C_T) \quad \text{[Equation 1]}$$

wherein $C_1$ represents a coefficient defined by [specific heat of the gaseous hydrogen]×[a pressure/flow rate conversion coefficient]×[a heat transfer rate of the bypass line], P2 represents the second pressure of the gaseous hydrogen measured by the second pressure sensor, P1 represents the first pressure of the gaseous hydrogen measured by the first pressure sensor, T represents a temperature of the gaseous hydrogen measured by the temperature sensor, and $C_T$ represents an internal temperature constant of the storage container.

10. The hydrogen storage system of claim 9, wherein the controller is configured to adjust the bypass flow rate of the gaseous hydrogen passing through the control valve to a flow rate higher than a predetermined reference flow rate when the heat quantity Q is smaller than a predetermined reference heat quantity, and wherein the controller is configured to adjust the bypass flow rate of the gaseous hydrogen passing through the control valve to a flow rate lower than the predetermined reference flow rate when the heat quantity Q is equal to or greater than the predetermined reference heat quantity.

11. The hydrogen storage system of claim 6, including:

a discharge line connected to the storage container and configured to discharge the gaseous hydrogen to the outside; and a discharge valve provided in the discharge line and configured to selectively open or close the discharge line.

12. The hydrogen storage system of claim 11, wherein when an input of an operation stop signal for the fuel cell system is detected while the fuel cell system operates, the operation of the fuel cell system is stopped when a condition is satisfied in which the compressor operates until the first pressure of the gaseous hydrogen becomes equal to or lower than a preset first target pressure in a state in which the control valve closes the bypass line.

13. The hydrogen storage system of claim 12, wherein a remaining amount HGR of the gaseous hydrogen remaining in the storage container at a point in time at which the operation of the fuel cell system is stopped satisfies the following Equation 2, $$HGR = f(HCL, CP) \times P1 \times \text{Density Coefficient of Liquid Hydrogen} \quad \text{[Equation 2]}$$

wherein, f represents a function of an occupation volume of the gaseous hydrogen in the storage container determined by a capacity CP of the storage container and a liquid level HCL of the liquid hydrogen, and P1 represents the first pressure of the gaseous hydrogen measured by the first pressure sensor.

14. The hydrogen storage system of claim 12, wherein the first target pressure is defined as a pressure lower than a preset operating pressure at which the discharge valve begins to operate to open the discharge line, and the first target pressure is 90% or less of the operating pressure.

15. The hydrogen storage system of claim 12, wherein an operation of the compressor is stopped when the second pressure of the gaseous hydrogen is equal to or greater than the first target pressure.

16. The hydrogen storage system of claim 12, wherein the first target pressure is defined as a pressure lower than a preset operating pressure at which the discharge valve begins to operate to open the discharge line.

17. The hydrogen storage system of claim 11, wherein when an input of an operation start signal for the fuel cell system is detected while the operation of the fuel cell system is stopped and the first pressure of the gaseous hydrogen is lower than a preset second target pressure, the fuel cell system operates when a condition is satisfied in which the compressor operates until the first pressure of the gaseous hydrogen becomes equal to or greater than the second target pressure in a state in which the control valve opens the bypass line.

18. The hydrogen storage system of claim 1, wherein the bypass line is provided to pass through the inside of the storage container, a first end portion of the bypass line is connected to the supply line between the compressor and the fuel cell system, and a second end portion of the bypass line is connected to the supply line between the compressor and the storage container.

19. The hydrogen storage system of claim 1, wherein a first end portion of the bypass line is connected to the supply line between the compressor and the fuel cell system, and a second end portion of the bypass line is exposed to the inside of the storage container.

20. The hydrogen storage system of claim 1, including:
a heating part provided in the supply line and disposed between the storage container and the compressor.

* * * * *